US009925999B2

(12) United States Patent
Young et al.

(10) Patent No.: US 9,925,999 B2
(45) Date of Patent: Mar. 27, 2018

(54) POWER ASSIST WAGON

(71) Applicant: RADIO FLYER INC., Chicago, IL (US)

(72) Inventors: Matthew E. Young, Chicago, IL (US); Daniel R. Greenberg, Lexington, MA (US)

(73) Assignee: RADIO FLYER INC., Chicago, IL (US)

( * ) Notice: Subject to any disclaimer, the term of this patent is extended or adjusted under 35 U.S.C. 154(b) by 0 days.

(21) Appl. No.: 15/278,751

(22) Filed: Sep. 28, 2016

(65) Prior Publication Data
US 2017/0088157 A1 Mar. 30, 2017

Related U.S. Application Data

(60) Provisional application No. 62/234,383, filed on Sep. 29, 2015.

(51) Int. Cl.
*B62D 51/04* (2006.01)
*B62B 5/00* (2006.01)
*B62B 3/00* (2006.01)

(52) U.S. Cl.
CPC ............ *B62B 5/0073* (2013.01); *B62B 3/007* (2013.01); *B62B 5/0036* (2013.01)

(58) Field of Classification Search
CPC ............ B62D 51/04; B60B 15/00; B62B 3/07
See application file for complete search history.

(56) References Cited

U.S. PATENT DOCUMENTS

| 434,672 | A | 8/1890 | Mersick |
| 2,468,316 | A | 4/1949 | Waters |
| 2,671,520 | A | 3/1954 | Elliott et al. |
| 2,906,357 | A | 9/1959 | Pletka |
| 2,923,365 | A | 2/1960 | McKechnie |
| 2,942,579 | A | 6/1960 | Gibson |
| 2,989,318 | A | 6/1961 | Schenkman |
| 3,036,651 | A | 5/1962 | Paul et al. |
| 3,090,459 | A | 5/1963 | Scudder |
| 3,182,835 | A | 5/1965 | Meyer et al. |

(Continued)

FOREIGN PATENT DOCUMENTS

TW M288610 U 3/2006

OTHER PUBLICATIONS

International Search Report from related International Patent Application No. PCT/US2016/054445, dated Dec. 13, 2016.

*Primary Examiner* — John Walters
*Assistant Examiner* — James Triggs
(74) *Attorney, Agent, or Firm* — McDermott Will & Emery LLP

(57) ABSTRACT

A power assist system for a wagon is provided. The power assist system provides a rotational force to one or more drive wheels under certain conditions to provide propulsion for the wagon. The power assist wagon preferably includes a drive system for providing the rotational force to the drive wheel, a control system for determining when the drive system should be activated and how much propulsion assist to provide to the drive wheel, and a power system for providing power to the drive system. The power assist wagon may also have a safety cut-off system to preclude the drive system from providing a rotational force to the drive wheel 16 even when the system is in the "on" mode.

17 Claims, 24 Drawing Sheets

(56) References Cited

U.S. PATENT DOCUMENTS

| | | |
|---|---|---|
| 3,280,932 A | 10/1966 | Moulton |
| 3,291,243 A | 12/1966 | Friesser |
| 3,356,172 A | 12/1967 | Peckham et al. |
| 3,407,892 A | 10/1968 | Vosseller |
| 3,524,512 A | 8/1970 | Voeks et al. |
| 3,704,758 A | 12/1972 | Cropp |
| 3,731,756 A | 5/1973 | Hajec |
| 3,742,507 A | 6/1973 | Pirre |
| 3,773,131 A | 11/1973 | Jaulmes |
| 3,841,428 A | 10/1974 | Bialek |
| 3,871,464 A | 3/1975 | Eden |
| 3,893,532 A | 7/1975 | Perlowin |
| 3,905,442 A | 9/1975 | O'Neill, Jr. |
| 3,915,250 A | 10/1975 | Laden et al. |
| 3,921,741 A | 11/1975 | Garfinkle et al. |
| 3,939,932 A | 2/1976 | Rosen |
| 3,991,843 A | 11/1976 | Davidson |
| 4,030,562 A | 6/1977 | Leighton et al. |
| 4,044,851 A | 8/1977 | Shaw et al. |
| 4,085,814 A | 4/1978 | Davidson et al. |
| 4,095,663 A | 6/1978 | Gaffney |
| 4,105,084 A | 8/1978 | Baak |
| 4,106,583 A | 8/1978 | Nemeth |
| 4,122,907 A | 10/1978 | Davidson et al. |
| 4,143,730 A | 3/1979 | Desmond |
| 4,168,758 A | 9/1979 | Holt |
| 4,221,275 A | 9/1980 | Pennebaker et al. |
| 4,280,581 A | 7/1981 | Rudwick |
| 4,393,954 A | 7/1983 | Soucy et al. |
| 4,410,060 A | 10/1983 | Cunard |
| 4,413,692 A | 11/1983 | Clifft |
| 4,538,696 A | 9/1985 | Carter |
| 4,570,732 A | 2/1986 | Craven |
| 4,591,017 A | 5/1986 | Enjo et al. |
| 4,615,406 A | 10/1986 | Bottenschein et al. |
| 4,637,274 A | 6/1987 | Goldenfield |
| 4,771,840 A | 9/1988 | Keller |
| 4,844,493 A | 7/1989 | Kramer |
| 4,844,683 A | 7/1989 | Compton |
| 4,848,504 A | 7/1989 | Olson |
| 4,960,179 A | 10/1990 | Leach |
| 5,137,103 A | 8/1992 | Cartmell |
| 5,161,635 A | 11/1992 | Kiffe |
| 5,167,389 A | 12/1992 | Reimers |
| 5,180,023 A | 6/1993 | Reimers |
| 5,226,501 A | 7/1993 | Takata |
| 5,237,263 A | 8/1993 | Gannon |
| 5,245,144 A | 9/1993 | Stammen |
| 5,316,101 A | 5/1994 | Gannon |
| 5,341,892 A | 8/1994 | Hirose et al. |
| 5,350,982 A | 9/1994 | Seib |
| 5,368,122 A | 11/1994 | Chou |
| 5,370,200 A | 12/1994 | Takata |
| 5,375,676 A | 12/1994 | Takata et al. |
| 5,433,284 A | 7/1995 | Chou |
| 5,474,148 A | 12/1995 | Takata |
| 5,505,277 A | 4/1996 | Suganuma et al. |
| 5,526,894 A | 6/1996 | Wang |
| 5,540,296 A | 7/1996 | Strothmann |
| 5,547,035 A | 8/1996 | Berry |
| 5,560,383 A | 10/1996 | Fuller |
| 5,602,448 A | 2/1997 | Yaguchi |
| 5,603,388 A | 2/1997 | Yaguchi |
| 5,657,828 A | 8/1997 | Nagamachi |
| 5,662,187 A | 9/1997 | McGovern |
| 5,664,636 A | 9/1997 | Ikuma et al. |
| 5,685,385 A | 11/1997 | Sanuga |
| 5,746,282 A | 5/1998 | Fujiwara et al. |
| 5,749,424 A | 5/1998 | Reimers |
| 5,749,429 A | 5/1998 | Yamauchi et al. |
| 5,755,304 A | 5/1998 | Trigg et al. |
| 5,758,736 A | 6/1998 | Yamauchi |
| 5,777,442 A | 7/1998 | Miyata |
| 5,799,747 A | 9/1998 | Olsen |
| 5,806,621 A | 9/1998 | Soda et al. |
| 5,806,864 A | 9/1998 | Zielinski |
| 5,816,355 A | 10/1998 | Battlogg et al. |
| 5,819,867 A | 10/1998 | Matsumoto et al. |
| 5,857,537 A | 1/1999 | Matsumoto et al. |
| 5,860,487 A | 1/1999 | Tanaka et al. |
| 5,865,267 A | 2/1999 | Mayer et al. |
| 5,878,831 A | 3/1999 | Saito et al. |
| 5,899,284 A | 5/1999 | Reimers et al. |
| 5,909,781 A | 6/1999 | Yonekawa et al. |
| 5,910,714 A | 6/1999 | Buchanan et al. |
| 5,924,511 A | 7/1999 | Takata |
| 5,934,401 A | 8/1999 | Mayer et al. |
| 5,984,038 A | 11/1999 | Fujiwara et al. |
| 6,011,366 A | 1/2000 | Murakami et al. |
| 6,015,021 A | 1/2000 | Tanaka et al. |
| 6,024,186 A | 2/2000 | Suga |
| 6,062,328 A | 5/2000 | Campbell et al. |
| 6,062,329 A | 5/2000 | Chai |
| 6,065,557 A | 5/2000 | Von Keyserling |
| 6,070,679 A | 6/2000 | Berg et al. |
| 6,073,717 A | 6/2000 | Yamamoto et al. |
| 6,092,615 A | 7/2000 | Pusch et al. |
| 6,104,154 A | 8/2000 | Harada et al. |
| 6,131,683 A | 10/2000 | Wada |
| 6,152,249 A | 11/2000 | Li et al. |
| 6,152,250 A | 11/2000 | Shu-Hsien |
| 6,173,801 B1 | 1/2001 | Kakutani et al. |
| 6,186,264 B1 | 2/2001 | Fujiwara et al. |
| 6,247,548 B1 | 6/2001 | Hayashi et al. |
| 6,260,646 B1 | 7/2001 | Fernandez et al. |
| 6,276,470 B1 | 8/2001 | Andreae, Jr. et al. |
| 6,276,471 B1 | 8/2001 | Kratzenberg et al. |
| 6,276,479 B1 | 8/2001 | Suzuki et al. |
| 6,290,014 B1 | 9/2001 | MacCready, Jr. |
| 6,296,072 B1 | 10/2001 | Turner |
| 6,308,792 B1 | 10/2001 | Garrett |
| RE37,443 E | 11/2001 | Yaguchi |
| 6,320,336 B1 | 11/2001 | Eguchi |
| 6,340,067 B1 | 1/2002 | Fujiwara et al. |
| 6,343,665 B1 | 2/2002 | Eberlein et al. |
| RE37,583 E | 3/2002 | Mayer et al. |
| 6,364,044 B1 | 4/2002 | Juan |
| 6,459,222 B1 | 10/2002 | Chen |
| 6,462,493 B2 | 10/2002 | Lan |
| 6,470,981 B1 | 10/2002 | Sueshige et al. |
| 6,580,188 B2 | 6/2003 | Katagiri et al. |
| 6,591,929 B1 | 7/2003 | Tsuboi et al. |
| 6,629,574 B2 | 10/2003 | Turner |
| 6,634,452 B2 | 10/2003 | Cheng et al. |
| 6,659,565 B2 | 12/2003 | Brant |
| 6,684,971 B2 | 2/2004 | Yu et al. |
| 6,752,224 B2 | 6/2004 | Hopper et al. |
| 6,772,850 B1 | 8/2004 | Waters et al. |
| 6,886,111 B1 | 3/2005 | Dube et al. |
| 6,874,592 B2 | 4/2005 | Yokotani et al. |
| 6,880,661 B1 | 4/2005 | Oh |
| 6,907,949 B1 | 6/2005 | Wang |
| 6,957,129 B2 | 10/2005 | Hatanaka et al. |
| 6,976,551 B2 | 12/2005 | Spanski |
| 7,007,765 B2 | 3/2006 | Waters et al. |
| 7,017,685 B2 | 3/2006 | Schoenberg |
| 7,040,440 B2 | 5/2006 | Kurita et al. |
| 7,150,339 B2 | 12/2006 | Liao et al. |
| 7,163,213 B2 | 1/2007 | Chambers |
| 7,185,726 B2 | 3/2007 | Young |
| 7,210,545 B1 | 5/2007 | Waid |
| 7,220,222 B2 | 5/2007 | Springston et al. |
| 7,261,175 B1 | 8/2007 | Fahrner |
| 7,357,209 B2 | 4/2008 | Kokatsu et al. |
| 7,370,720 B2 | 5/2008 | Kokatsu et al. |
| 7,389,836 B2 | 6/2008 | Johnson et al. |
| 7,411,366 B2 | 8/2008 | Kang et al. |
| 7,490,684 B2 | 2/2009 | Seymour et al. |
| 7,493,979 B2 | 2/2009 | Johnson et al. |
| 7,562,729 B2 | 7/2009 | Hammerle |
| 7,568,714 B2 | 8/2009 | Sasnowski et al. |
| 7,581,748 B2 | 9/2009 | Reimers |
| 7,584,985 B2 | 9/2009 | You et al. |
| 7,597,522 B2 | 10/2009 | Borntrager et al. |

(56) References Cited

U.S. PATENT DOCUMENTS

| | | |
|---|---|---|
| 7,604,079 B2 | 10/2009 | Pittman |
| 7,607,711 B2 | 10/2009 | Marshall |
| 7,641,285 B2 | 1/2010 | Jacobs |
| 7,704,035 B2 | 4/2010 | Borntrager et al. |
| 7,762,363 B1 | 7/2010 | Hirschfeld |
| 7,770,682 B2 | 8/2010 | Spanski |
| 7,779,948 B2 | 8/2010 | Gulas |
| 7,845,441 B2 | 12/2010 | Chambers |
| 7,886,853 B2 | 2/2011 | Konopa |
| 7,926,599 B2 | 4/2011 | Meyers |
| 8,120,190 B2 | 2/2012 | Bravo |
| 8,167,061 B2 | 5/2012 | Scheuerman et al. |
| 8,186,931 B2 | 5/2012 | Borntrager et al. |
| 8,251,389 B2 | 8/2012 | Juan |
| 8,276,692 B1 | 10/2012 | Nwaeke |
| 8,286,739 B2 | 10/2012 | Oliphant |
| 8,297,384 B2 | 10/2012 | Wanger et al. |
| 8,336,654 B1 | 12/2012 | Licon |
| 8,365,850 B2 | 2/2013 | Gal et al. |
| 8,453,771 B1 | 6/2013 | Hirschfeld |
| 8,490,732 B2 | 7/2013 | Suigmoto et al. |
| 8,511,406 B2 | 8/2013 | Anasiewicz |
| 8,532,857 B2 | 9/2013 | Hsu et al. |
| 8,573,338 B2 | 11/2013 | Gal et al. |
| 8,573,346 B2 | 11/2013 | Duignan |
| 8,596,389 B2 | 12/2013 | Anasiewicz |
| 8,616,321 B2 | 12/2013 | Aoki et al. |
| 8,636,095 B2 | 1/2014 | Ito |
| 8,640,805 B2 | 2/2014 | Kuroki |
| 8,651,215 B2 | 2/2014 | Ogura |
| 8,655,531 B2 | 2/2014 | Saida |
| 8,660,728 B2 | 2/2014 | Saida |
| 8,662,232 B2 | 3/2014 | Nakamura et al. |
| 8,672,081 B2 | 3/2014 | Kume et al. |
| 8,684,122 B2 | 4/2014 | Maeno et al. |
| 8,689,921 B2 | 4/2014 | Aoki et al. |
| 8,708,084 B2 | 4/2014 | Kuroki et al. |
| 8,725,340 B1 | 5/2014 | Hosaka et al. |
| 8,746,377 B1 | 6/2014 | Dunbar |
| 8,746,710 B2 | 6/2014 | Schejbal |
| 8,777,804 B2 | 7/2014 | Takachi |
| 8,781,663 B2 | 7/2014 | Watarai |
| 8,794,368 B2 | 8/2014 | Gu et al. |
| 8,820,459 B2 | 9/2014 | Hashimoto et al. |
| 8,820,461 B2 | 9/2014 | Shinde et al. |
| 8,831,810 B2 | 9/2014 | Shoge et al. |
| 8,851,215 B2 | 10/2014 | Goto |
| 8,886,426 B2 | 11/2014 | Cheng |
| 8,892,279 B2 | 11/2014 | Aoki et al. |
| 8,925,661 B2 | 1/2015 | Minoshima et al. |
| 8,936,129 B2 | 1/2015 | Honda et al. |
| 8,958,935 B2 | 2/2015 | Shoge |
| 8,972,086 B2 | 3/2015 | Komatsu |
| 9,033,347 B1 | 5/2015 | Westrate et al. |
| 9,045,152 B2 | 6/2015 | Sekine et al. |
| 9,073,601 B2 | 7/2015 | Carolin |
| 9,079,634 B2 | 7/2015 | Stieger |
| 9,085,342 B2 | 7/2015 | Jauvtis |
| 9,145,154 B1 | 9/2015 | Horowitz |
| 2002/0084119 A1 | 7/2002 | Brabetz et al. |
| 2002/0148658 A1 | 10/2002 | Li |
| 2004/0026144 A1 | 2/2004 | Lan |
| 2004/0144585 A1 | 7/2004 | Vasser |
| 2004/0206563 A1 | 10/2004 | Murata |
| 2004/0216933 A1* | 11/2004 | Coale ................ B62D 51/04 180/19.1 |
| 2004/0245745 A1 | 12/2004 | Vasser |
| 2005/0230928 A1 | 10/2005 | Raney |
| 2005/0275195 A1 | 12/2005 | Matula |
| 2005/0279537 A1 | 12/2005 | Nguyen |
| 2006/0037796 A1 | 2/2006 | Naegeli |
| 2006/0070784 A1 | 4/2006 | Tahara |
| 2006/0151224 A1 | 7/2006 | Vasser |
| 2006/0254831 A1 | 11/2006 | Kamei et al. |
| 2007/0034424 A1 | 2/2007 | Snowden et al. |
| 2007/0089917 A1 | 4/2007 | Hartley |
| 2007/0131462 A1 | 6/2007 | Hemsley |
| 2007/0194542 A1 | 8/2007 | Dixon |
| 2007/0252452 A1 | 11/2007 | Ishimoto et al. |
| 2007/0269300 A1 | 11/2007 | Menard |
| 2008/0041644 A1 | 2/2008 | Tudek et al. |
| 2008/0073880 A1 | 3/2008 | Bess |
| 2008/0197608 A1 | 8/2008 | Dixon |
| 2009/0014219 A1 | 1/2009 | Springston et al. |
| 2009/0218154 A1 | 9/2009 | Yee |
| 2009/0266636 A1 | 10/2009 | Naegeli |
| 2010/0123294 A1 | 5/2010 | Ellington et al. |
| 2010/0156069 A1 | 6/2010 | Chen |
| 2010/0181130 A1 | 7/2010 | Chou |
| 2010/0307851 A1 | 12/2010 | Spanski |
| 2011/0160945 A1 | 6/2011 | Gale |
| 2011/0232985 A1 | 9/2011 | Lee |
| 2012/0012409 A1 | 1/2012 | Turner et al. |
| 2012/0145469 A1 | 6/2012 | Tong |
| 2012/0160577 A1 | 6/2012 | Anasiewicz |
| 2012/0316709 A1 | 12/2012 | Saida |
| 2013/0068549 A1 | 3/2013 | Laprade |
| 2013/0179016 A1 | 7/2013 | Gale |
| 2014/0062351 A1 | 3/2014 | Spelta et al. |
| 2014/0166383 A1 | 6/2014 | Arimune |
| 2014/0166385 A1 | 6/2014 | Arimune et al. |
| 2014/0196968 A1 | 7/2014 | Bieler et al. |
| 2014/0216837 A1 | 8/2014 | Hsu |
| 2014/0222268 A1 | 8/2014 | Tsuchizawa |
| 2014/0230149 A1 | 8/2014 | Schejbal |
| 2014/0246261 A1 | 9/2014 | Sekine et al. |
| 2014/0251704 A1 | 9/2014 | Sekine et al. |
| 2014/0264207 A1 | 9/2014 | Sekine et al. |
| 2014/0358344 A1* | 12/2014 | Katayama ............. A61H 3/04 701/22 |
| 2014/0365013 A1 | 12/2014 | Kruse |
| 2014/0366501 A1 | 12/2014 | Goto |
| 2015/0039165 A1 | 2/2015 | Fujita et al. |
| 2015/0053042 A1 | 2/2015 | Shirakawa et al. |
| 2015/0136509 A1 | 5/2015 | Tanaka et al. |
| 2015/0145224 A1 | 5/2015 | Zhu |
| 2015/0151771 A1 | 6/2015 | Jin |
| 2015/0158550 A1 | 6/2015 | Kawakami et al. |
| 2015/0191215 A1 | 7/2015 | Kawakami et al. |
| 2016/0347338 A1 | 12/2016 | Vargas, II |

* cited by examiner

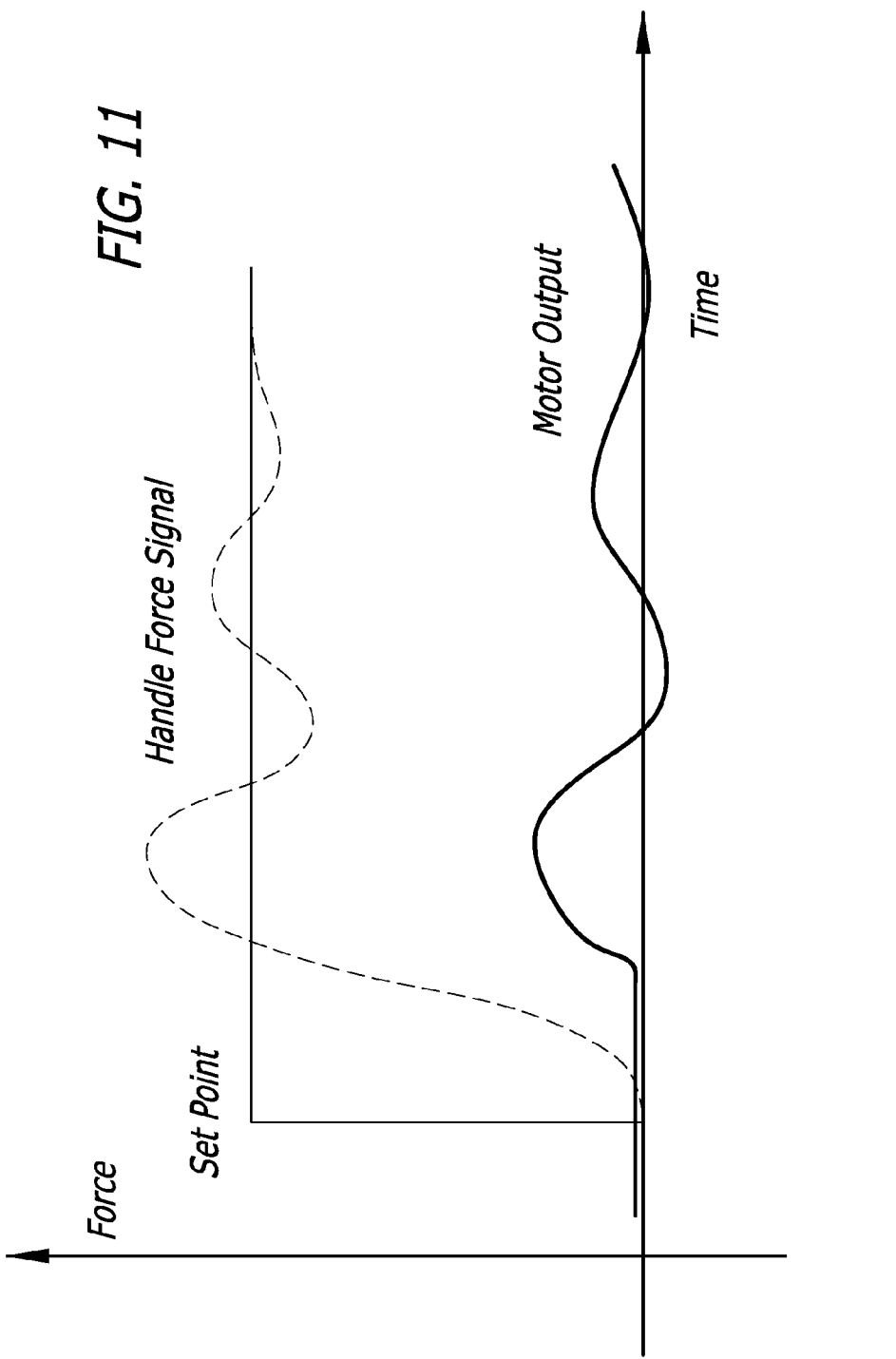

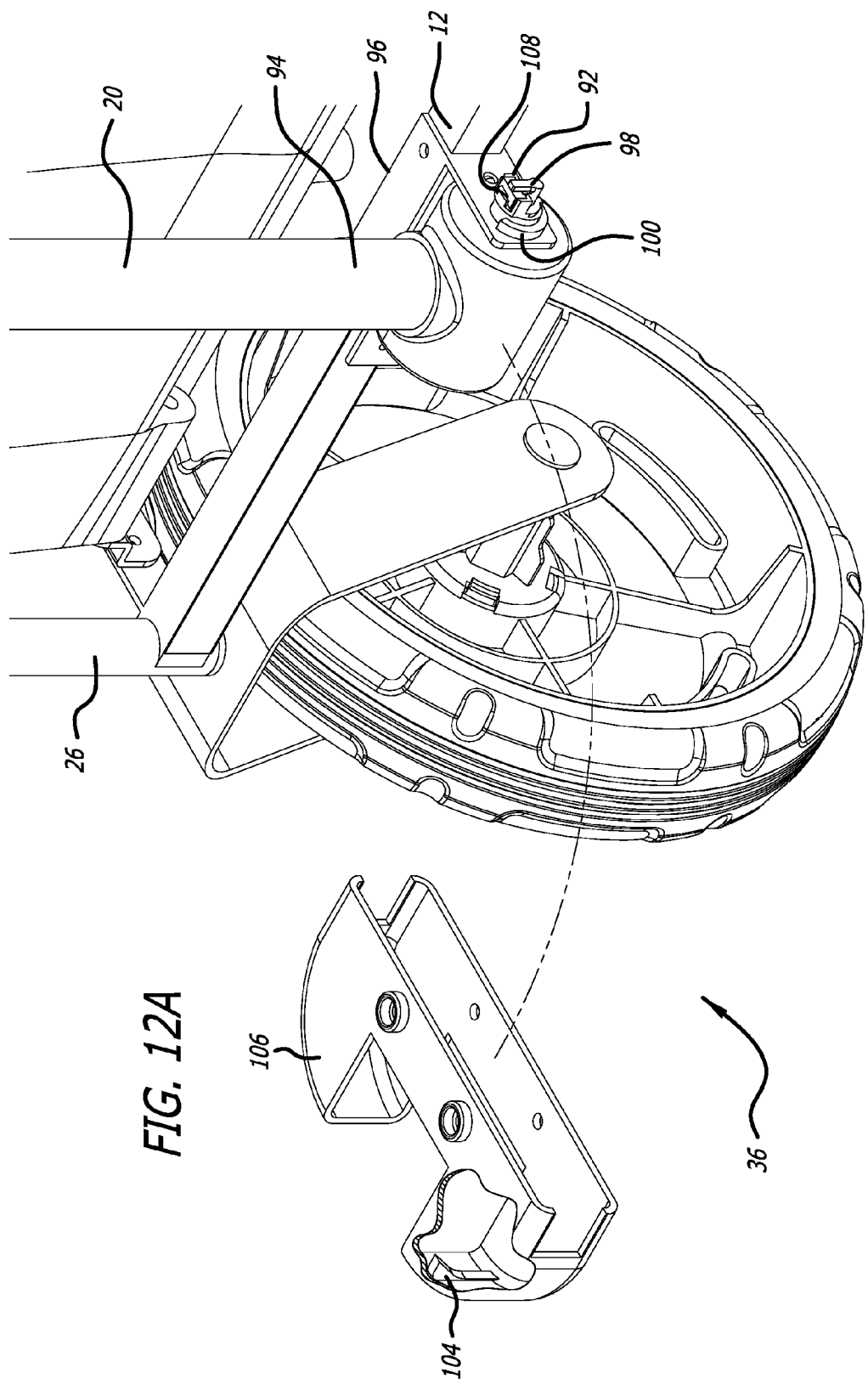

POWER ASSIST WAGON

CROSS-REFERENCE TO RELATED APPLICATIONS

This application claims the benefit of U.S. Provisional Patent Application No. 62/234,383, filed Sep. 29, 2015, which is expressly incorporated herein by reference and made a part hereof.

FEDERALLY SPONSORED RESEARCH OR DEVELOPMENT

Not Applicable.

TECHNICAL FIELD

The present disclosure generally relates to a wagon, and more particularly, to a wagon having a power assist feature.

BACKGROUND

Wagons, including folding wagons, are well known in the art. Further, powered drive mechanisms for vehicles and wagons are known in the art. While such wagons and drive mechanisms according to the prior art provide a number of advantages, they nevertheless have certain limitations. The disclosed embodiments seek to overcome certain of these limitations and other drawbacks of the prior art, and to provide new features not heretofore available. A full discussion of the features and advantages of the various embodiments is deferred to the following detailed description, which proceeds with reference to the accompanying drawings.

SUMMARY

According to one embodiment, the disclosed subject technology relates to a drive mechanism and drive control system. The drive mechanism and drive control system may be incorporated into a wagon, including a foldable wagon that is convertible from an open, unfolded or use position (i.e., an open configuration) to a closed or folded position (i.e., a closed configuration).

The disclosed subject technology further relates to a power assist system for a wagon, comprising: a wagon body, the wagon body having a plurality of wheels connected thereto, at least one of the plurality of wheels being a driven wheel; a handle having a distal end and a proximal end, the proximal end of the handle being pivotally connected to the wagon body; a handle grip adjacent a distal end of the handle; a control system in one of the handle and the handle grip, the control system comprising a sensor to sense a load being applied to the handle grip that moves at least a portion of the handle grip axially with respect to the proximal end of the handle; a drive system comprising a motor mechanically connected to the driven wheel; and, a microcontroller obtaining an input signal from the control system and providing an output signal to the drive system to selectively drive the driven wheel of the wagon.

The disclosed subject technology further relates to a power assist system for a wagon, comprising: a wagon body, the wagon body having a plurality of wheels connected thereto, at least one of the plurality of wheels being a driven wheel; the driven wheel rotatingly connected to an axle; a drive system comprising a motor mechanically connected to the driven wheel, the drive system further comprising a motor controller electrically connected to the motor; a handle having a distal end and a proximal end, the proximal end of the handle being pivotally connected to the wagon body; a handle grip adjacent a distal end of the handle, the handle grip having an internal sensor; and, a microcontroller electrically connected to the sensor and the motor controller, the microcontroller obtaining a signal from the sensor, and based on the signal from the sensor the microcontroller sending a signal to the motor controller to speed up or slow down the motor.

The disclosed subject technology further relates to a power assist system for a wagon, comprising: a wagon body, the wagon body having a plurality of wheels connected thereto, at least one of the plurality of wheels being a driven wheel; a handle having a distal end and a proximal end, the proximal end of the handle being pivotally connected to the wagon body and the distal end having a handle grip; a control sensor in the handle; a drive system comprising a motor mechanically connected to the driven wheel; a microcontroller obtaining an input signal from the control sensor and providing an output signal to the drive system to selectively drive the driven wheel of the wagon; and, a safety cut-off system connected to the handle, the safety cut-off system comprising a safety-control switch electrically connected to the microcontroller, the microcontroller adjusting the signal sent to the drive system based on a state of the safety-control switch.

The disclosed subject technology further relates to a control system that comprises a sensor to determine a load applied to the handle grip, wherein the load must be greater than a predetermined minimum threshold above zero pounds for the drive system to provide initial propulsion to the drive wheel.

The disclosed subject technology further relates to a micro switch as part of the control system, the micro switch being opened when a load greater than a predetermined minimum threshold above zero pounds is applied to the handle grip, the micro switch being closed when a load less than the predetermined minimum threshold is applied to the handle, and the microcontroller obtaining a signal from the micro switch as to whether the micro switch is open or closed.

The disclosed subject technology further relates to a spring adjacent the distal end of the handle, wherein the spring provides a force that must be overcome for the handle grip to move axially with respect to the proximal end of the handle.

The disclosed subject technology further relates to a control system including a remaining battery life indicator on the handle.

The disclosed subject technology further relates to a control system including an on/off switch, wherein the motor is electrically disconnected from the motor controller when the on/off switch is in the off state.

The disclosed subject technology further relates to a control system wherein the sensor within the handle senses an axial load being applied to the handle by a user.

The disclosed subject technology further relates to a safety cut-off system connected to the handle, the safety cut-off system comprising a safety-control switch electrically connected to the microcontroller, and the microcontroller adjusting the signal sent to the drive system based on a state of the safety-control switch. In one embodiment the microcontroller turns off the drive system when the handle is below a preset angle and when the handle is above a preset angle. In one embodiment the safety cut-off switch is adjacent the proximal end of the handle.

The disclosed subject technology further relates to a drive system that comprises a motor and a motor controller, and wherein the motor controller sends a signal to the motor to control output of the motor.

The disclosed subject technology further relates to a rechargeable battery connected to the wagon, the battery providing a source of power for the drive system. In one embodiment the battery is removable from the wagon, and the battery can be recharged on an auxiliary charger separate from the wagon.

The disclosed subject technology further relates to a control system wherein to provide an initial signal to the motor to speed up the sensor must sense a load greater than a predetermined minimum threshold above zero pounds.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

FIG. 11 is a schematic comparing a handle force signal to the motor output in one embodiment of a power assist wagon.

FIG. 12A is a perspective view of one embodiment of the connection assembly between the handle and the wagon frame, with the exterior cap removed.

DETAILED DESCRIPTION

Figure 1:
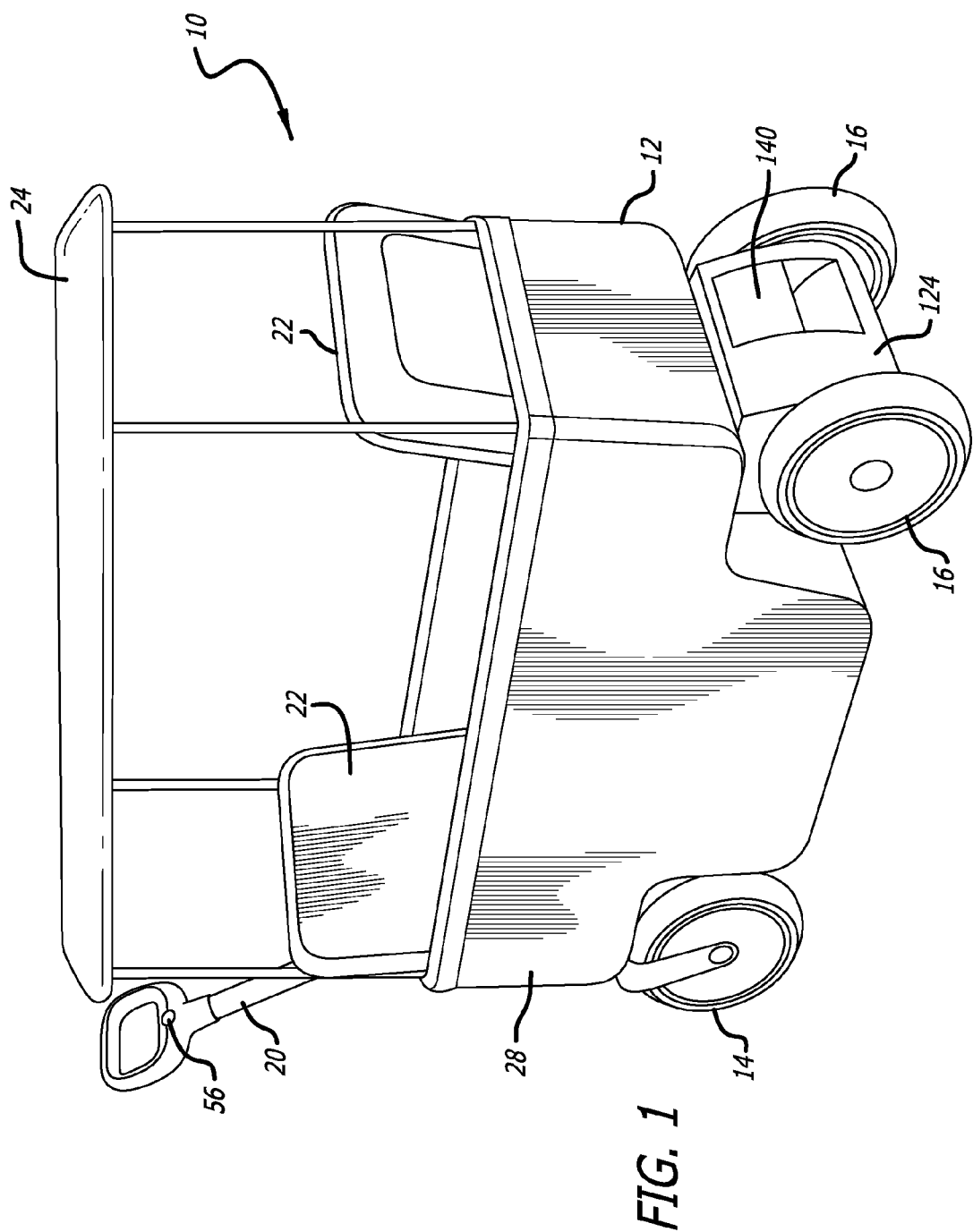
FIG. 1 is a top rear perspective view of a power assist wagon according to one embodiment.

While the power assist wagon discussed herein is susceptible of embodiments in many different forms, the disclosure will show in the drawings, and will herein describe in detail, preferred embodiments with the understanding that the present description is to be considered as an exemplification of the principles of the power assist wagon and are not intended to limit the broad aspects of the disclosure to the embodiments illustrated.

The power assist wagon is a product that is intended to be used by adults to provide a powered assist when pulling a wagon and when the pulling force exceeds a certain threshold.

Figure 2:
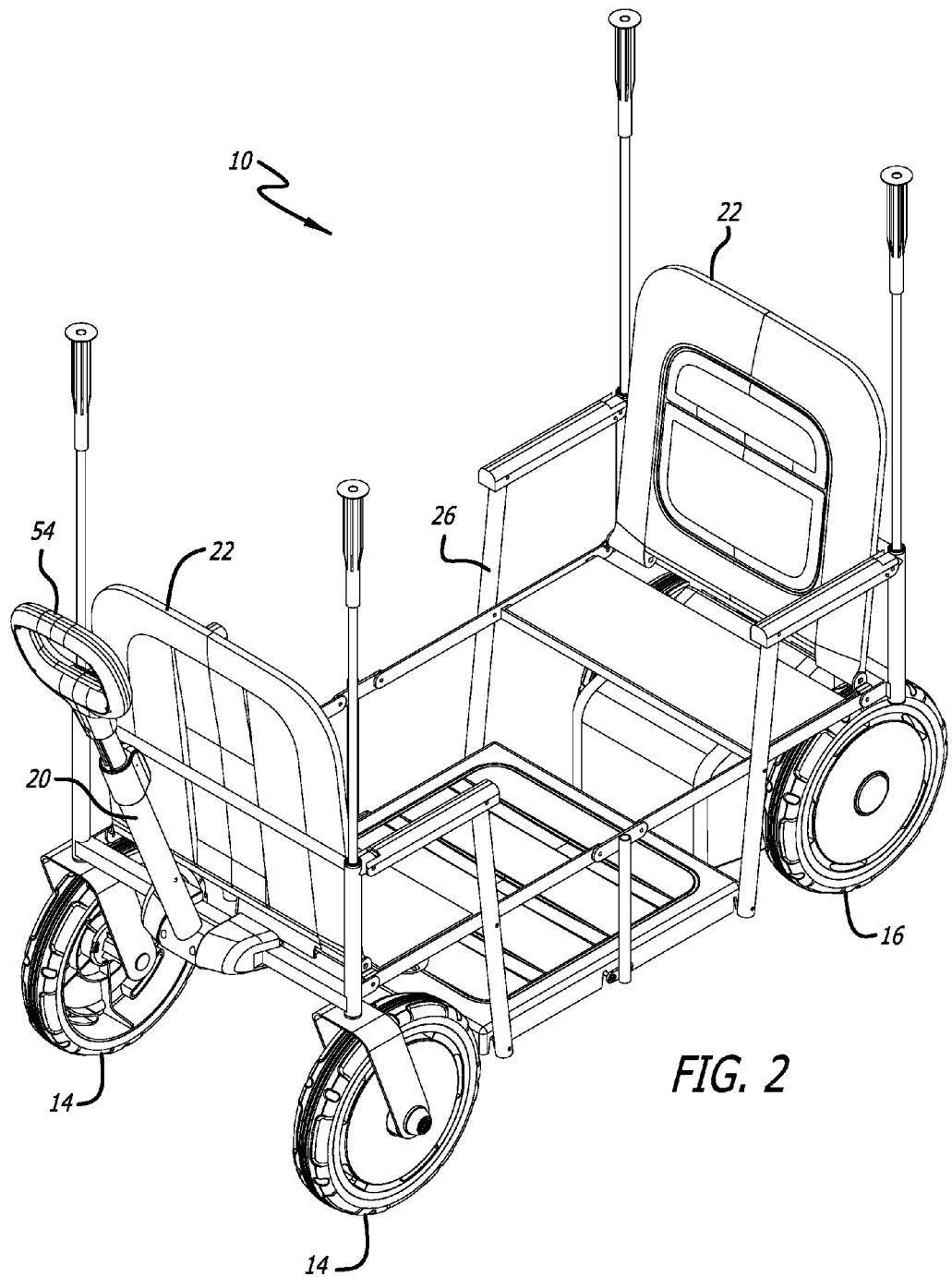
FIG. 2 is a top front perspective view of a power assist wagon according to one embodiment.
Figure 3:
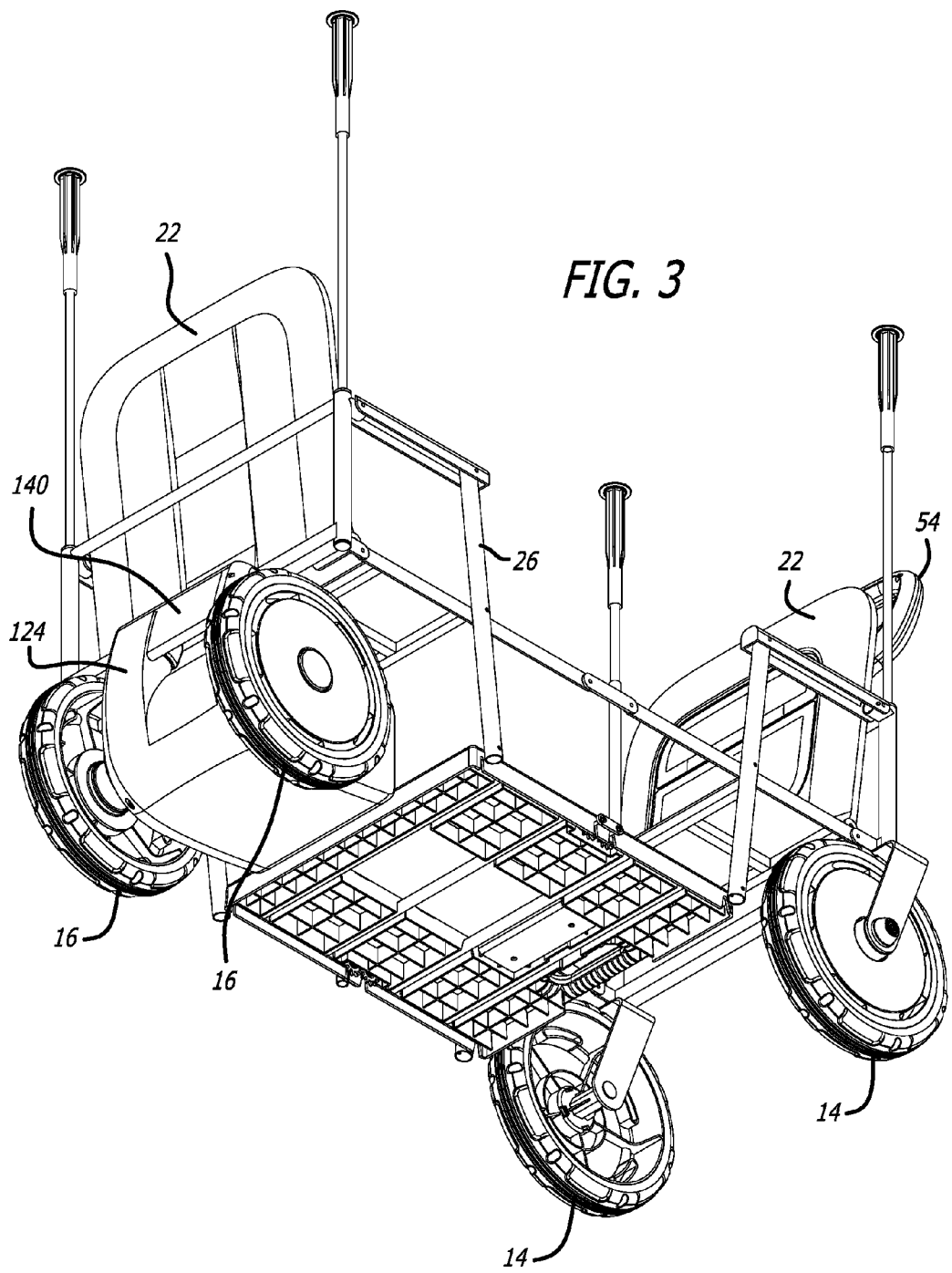
FIG. 3 is bottom rear perspective view of a power assist wagon according to one embodiment.

Referring now to the figures, and initially to FIGS. 1-3, there is shown one embodiment of the power assist wagon 10. The power assist wagon 10 may have a wagon body 12, a pair of front wheels 14, which may be caster-type wheels to allow for turning/steering of the wagon 10, a pair of rear wheels 16 mounted on a rear axle 18, and a handle 20 to pull and steer the wagon 10. The wagon 10 may also have one or more seats 22 provided within the interior of the wagon body 12, and a wagon canopy 24 to shade the riders in the wagon 10. In one embodiment the wagon body may comprise a frame 26 and a removable, or permanently affixed, shell 28, such as a fabric shell 28 provided in the embodiment shown in FIG. 1. Finally, the wagon 10 may be a folding wagon so that it folds from an open position as shown in FIG. 1, to a closed or folded position for transport and storage.

Figure 14A:
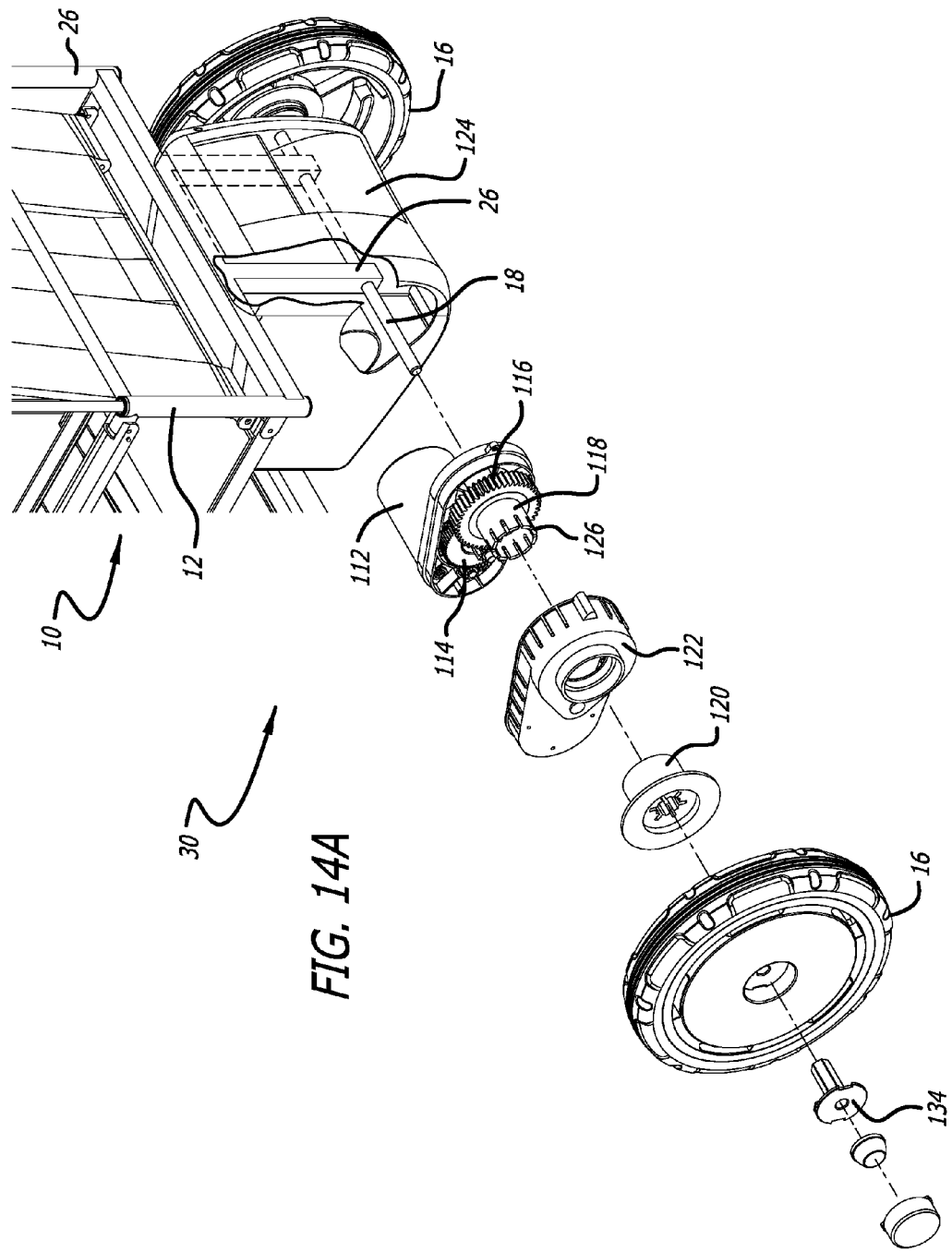
FIG. 14A is an exploded perspective view of one embodiment of a drive system for a power assist wagon.
Figure 14B:
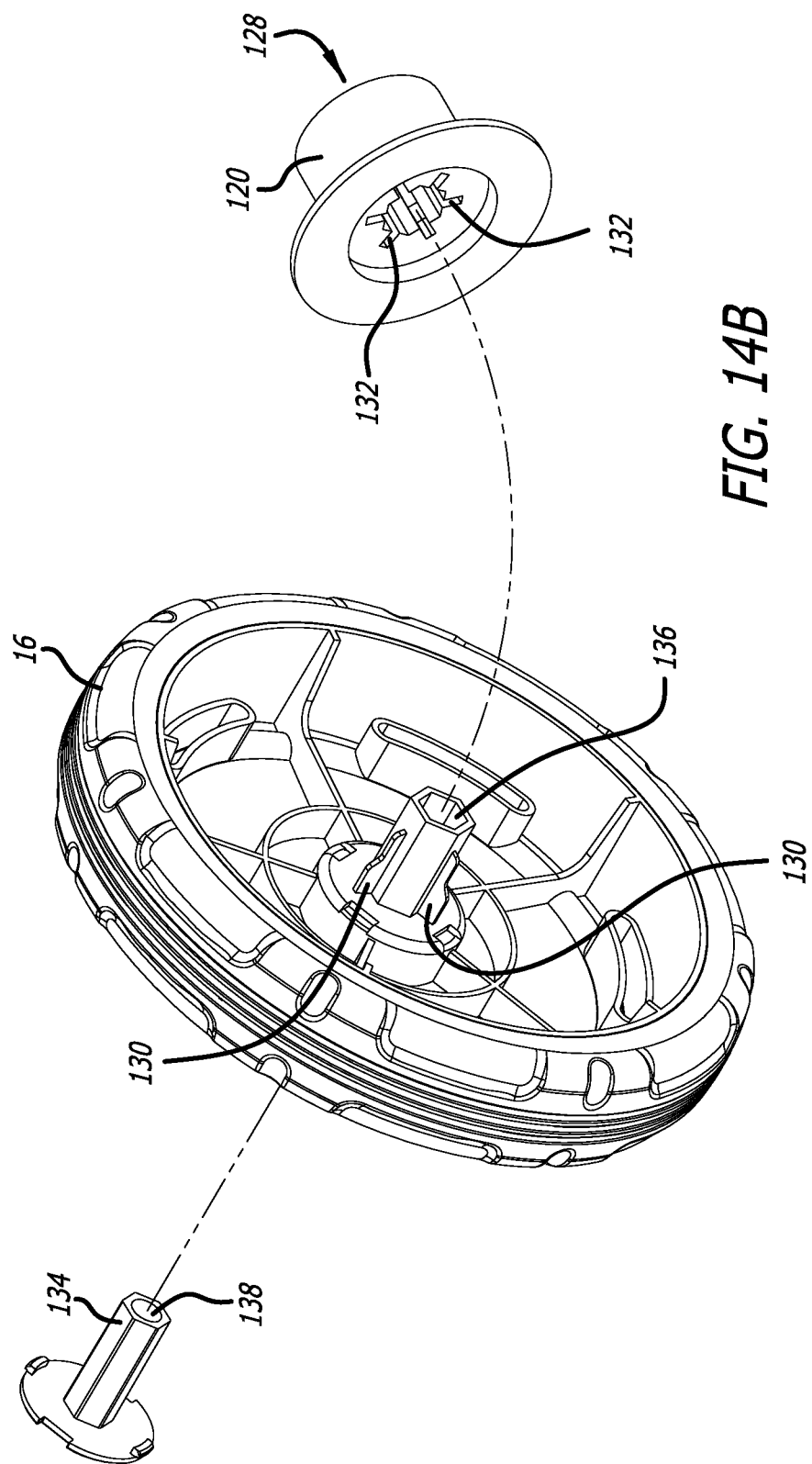
FIG. 14B is a partial perspective view of one embodiment of a drive wheel and drive adapter for connecting the drive wheel to the drive system.
Figure 14C:
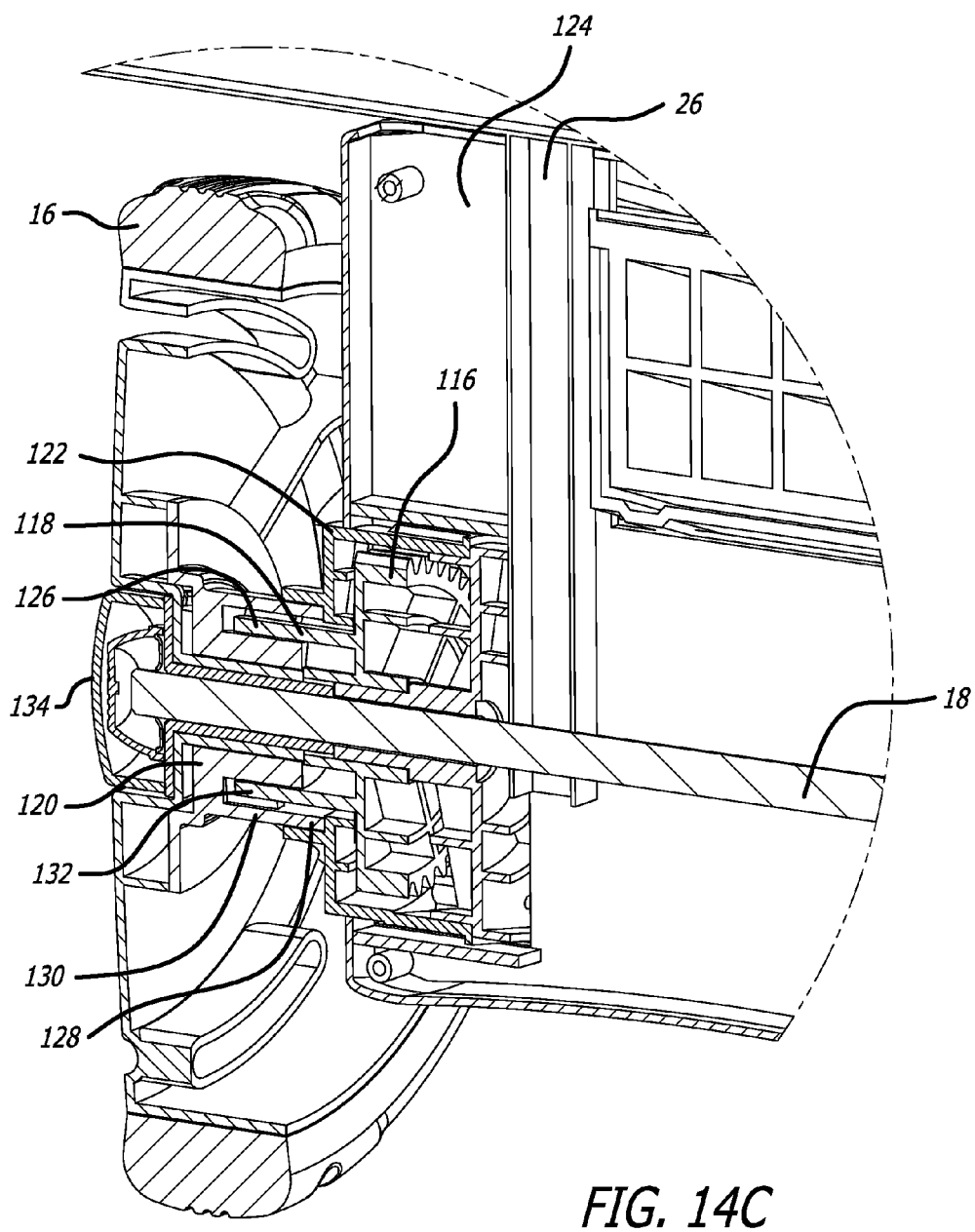
FIG. 14C is a cross-sectional view of the drive wheel connected to the drive system, according to one embodiment.

As shown in FIGS. 14A-14C, one or more of the wheels, and preferably one or more of the rear wheels 16 may be driven under certain conditions to provide propulsion for the wagon 10. To provide the propulsion, the power assist wagon 10 preferably includes a drive system 30 for providing a rotational force to the drive wheel 16, a control system 32 for determining when the drive system 30 should be activated and how much propulsion assist to provide to the drive wheel 16, and a power system 34 for providing power to the drive system 30. The power assist wagon 10 may also have a safety cut-off system 36 to preclude the drive system 30 from providing a rotational force to the drive wheel 16 even when the system is in the "on" mode.

Figures 4A, 4B:
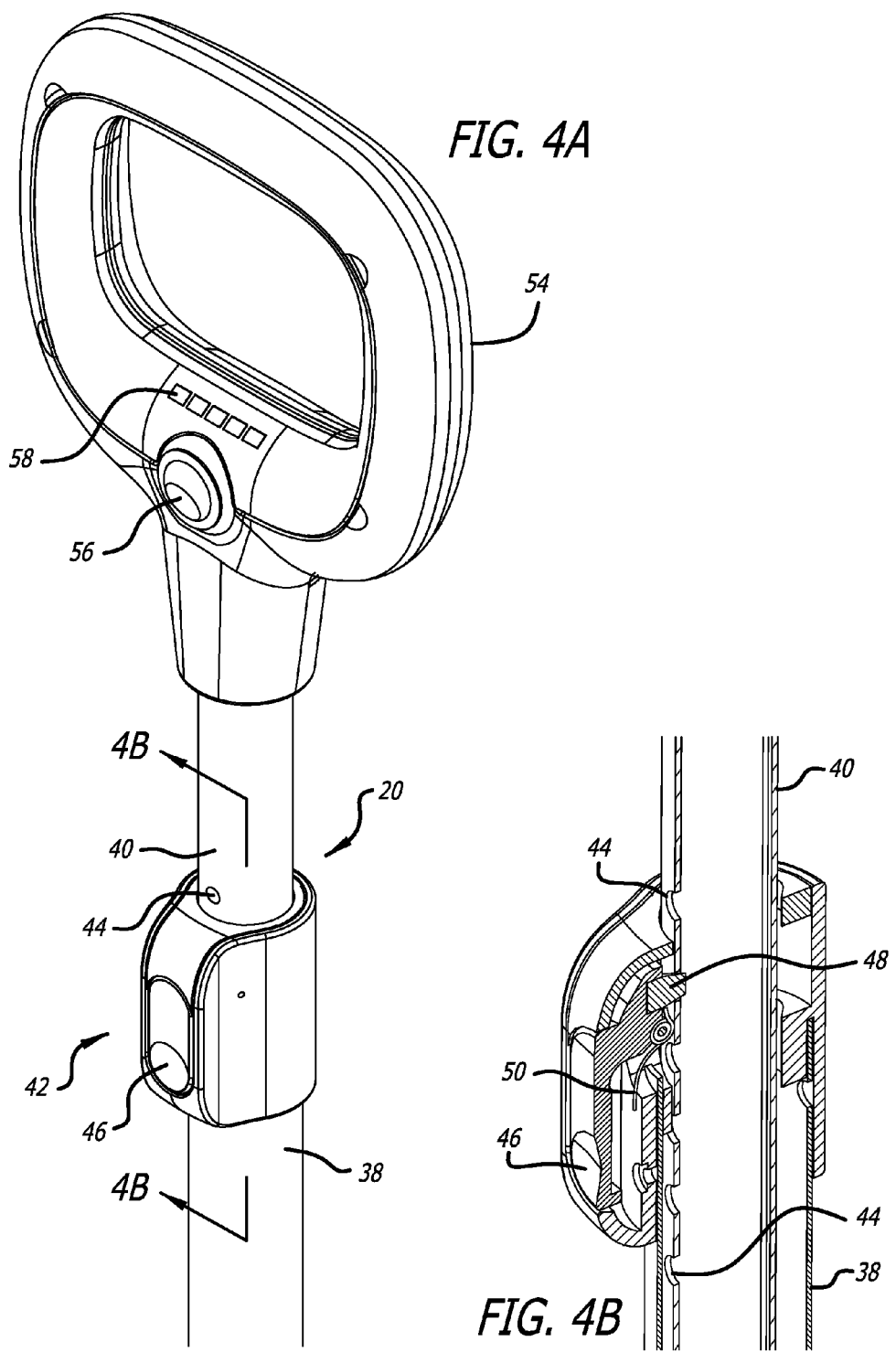
FIG. 4A is a perspective view of one embodiment of a handle for a power assist wagon.
FIG. 4B is a partial cross-sectional view of the handle of FIG. 4A about lines 4B-4B.

In one embodiment, the handle 20 of the wagon 10 has a telescoping feature. Referring to FIGS. 4A and 4B, the telescoping feature is preferably provided for by having an outer handle tube 38, an inner handle tube 40 and a securing mechanism 42. The inner handle tube 40 can telecopingly slide in the outer handle tube 38 to adjust the overall handle length to the desired length. It is understood that the inner and out tubes may be reversed. Additionally, the inner handle tube 40 has a series of spaced-apart apertures 44. The securing mechanism 42 is connected to the outer handle tube 38 and has a spring-loaded pivoting lever 46 with a stopper 48 that is adapted to engage the apertures 44 in the inner handle tube 40. As shown in FIG. 4B, by depressing an end of the pivoting lever 46 and overcoming the spring force of the spring 50, the stopper 48 is pivoted out of the aperture 44 and the inner handle tube 40 can be slid inwardly or outwardly with respect to the outer tuber 38 to effectuate shortening or lengthening of the handle 20. When the inner handle tube 40 is relocated to the desired position, the lever 46 can be released and the force of the spring 50 will push the stopper 48 into the aperture 44 positioned adjacent the stopper 48. It has been determined that it is beneficial to have a securing mechanism 42 that is provided on the outside of the outer and inner handle tubes 38, 40 to limit the structure inside the central portion of the tubes 38, 40 that could interfere with the wires therein.

Referring also to FIGS. 2 and 4A, the distal end 52 of the handle 20 has a hand grip portion 54 (also referred to as a handle grip portion 54 or handle grip 54). An on/off toggle switch 56 is provided in the hand grip portion 54 of the handle 20. When the on/off toggle switch 56 is turned to the "on" position the battery powers and turns on the microcontroller and the motor controller. Further, in a preferred embodiment a relay connects the motor controller with the motor. The relay is automatically off when the on/off switch 56 is in the "off" position, electrically disconnecting the motor from the motor controller. This helps to prevent back-EMF and allows the motor to be turned easier manually when the wagon is not powered up. A battery indicator 58 is also preferably provided in the hand grip portion 54 of the handle 20. In one embodiment, the battery indicator 58 comprises a series of lights. Preferably, five lights are provided, each light relating to 20% battery life. Accordingly, when all five lights are illuminated the remaining battery life is approximately 80-100%, when four of the five lights are illuminated the remaining battery life is approximately 60-80%, when three of the five lights are illuminated the remaining battery life is approximately 40-60%, when two of the five lights are illuminated the remaining battery life is approximately 20-40%, and when one of the five lights are illuminated the remaining battery life is approximately 0-20%.

Figure 7:
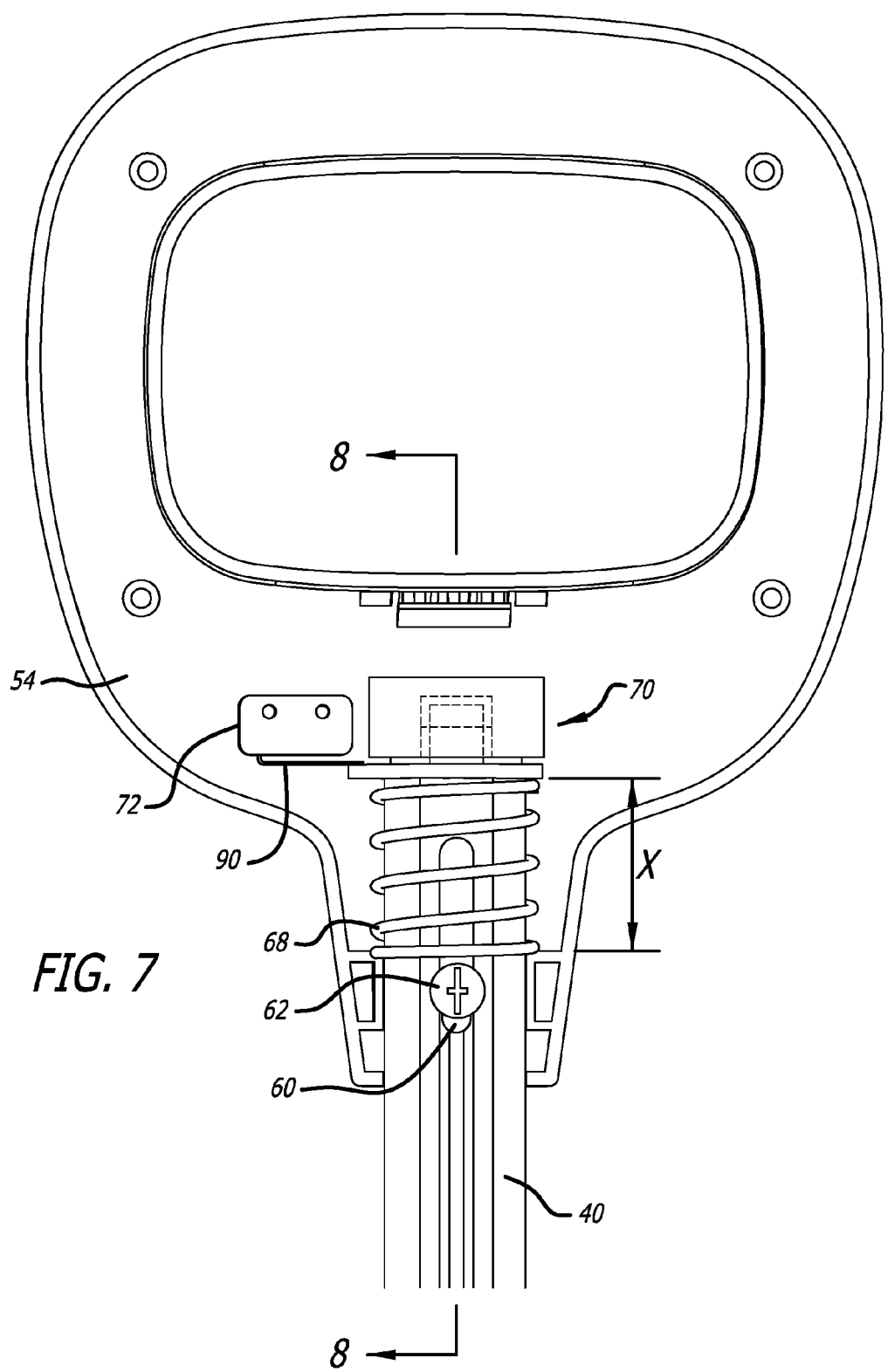
FIG. 7 is a front view of another embodiment of the input module in the handle of the power assist wagon, with the handle shown in the unactuated state.
Figure 8:
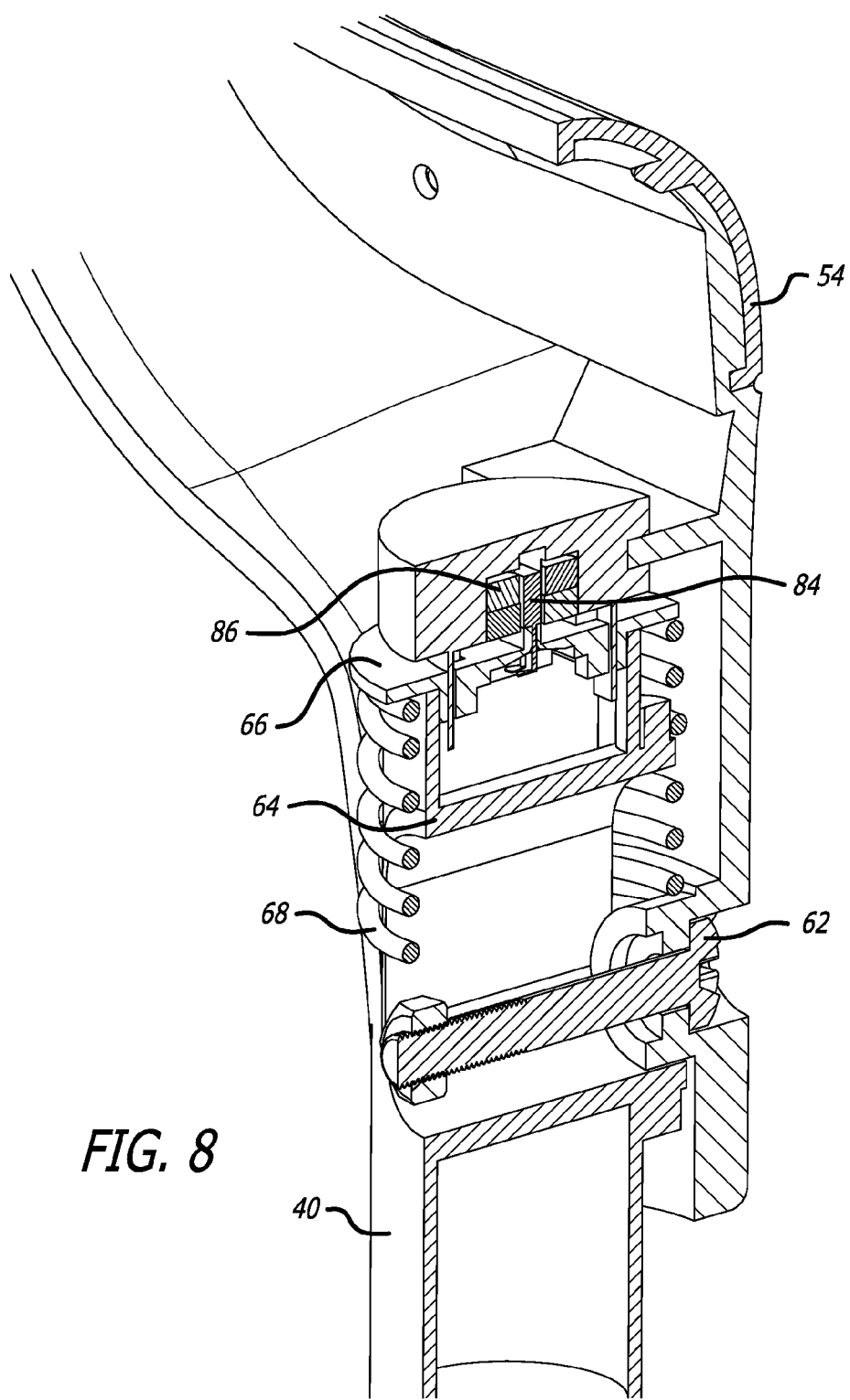
FIG. 8 is a partial cross-sectional perspective view of the input module of the handle as shown in FIG. 7 about lines 8-8.
Figure 9:
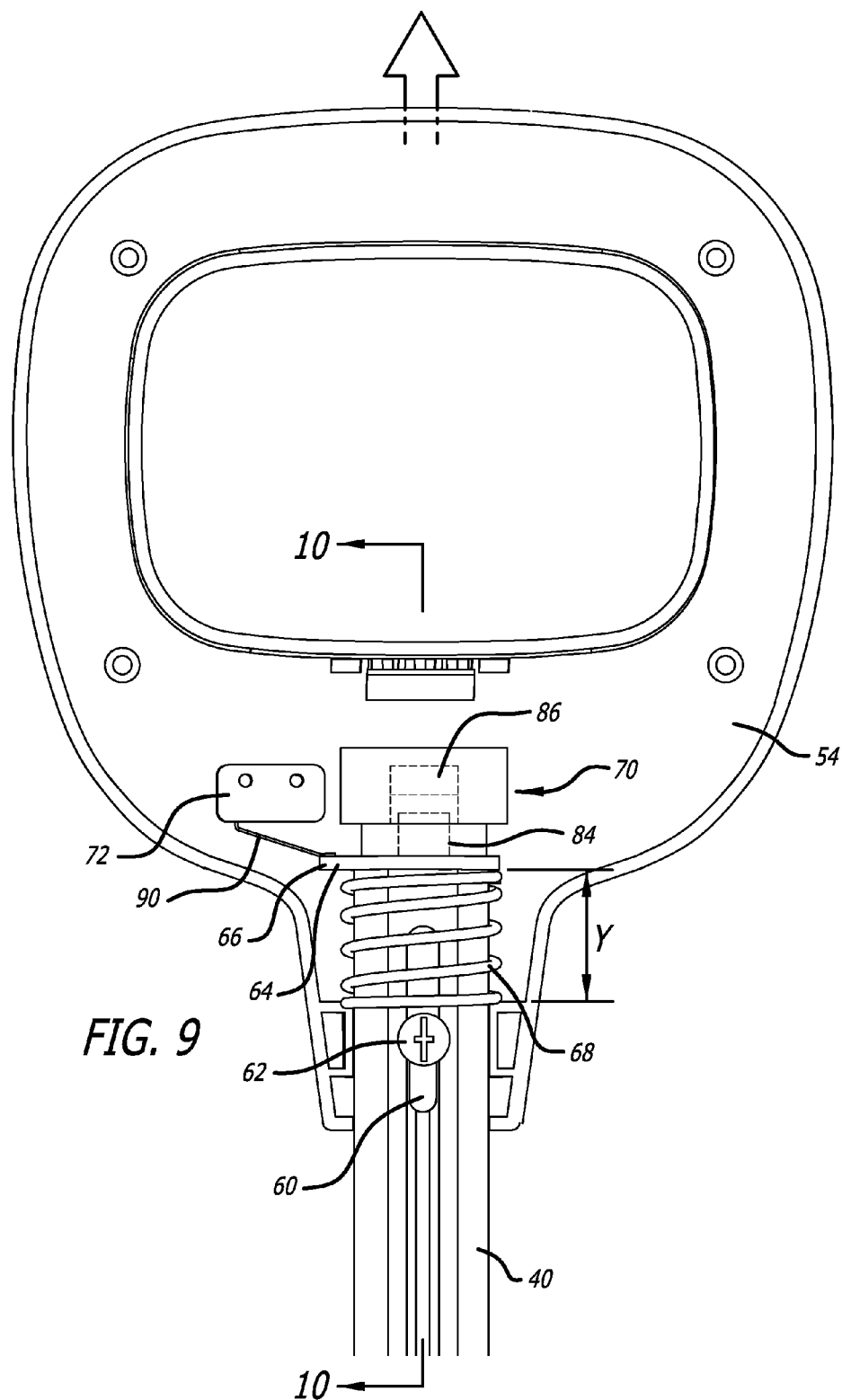
FIG. 9 is a front view of the input module in the handle of the power assist wagon of FIG. 7, with the handle shown in the actuated state.
Figure 10:
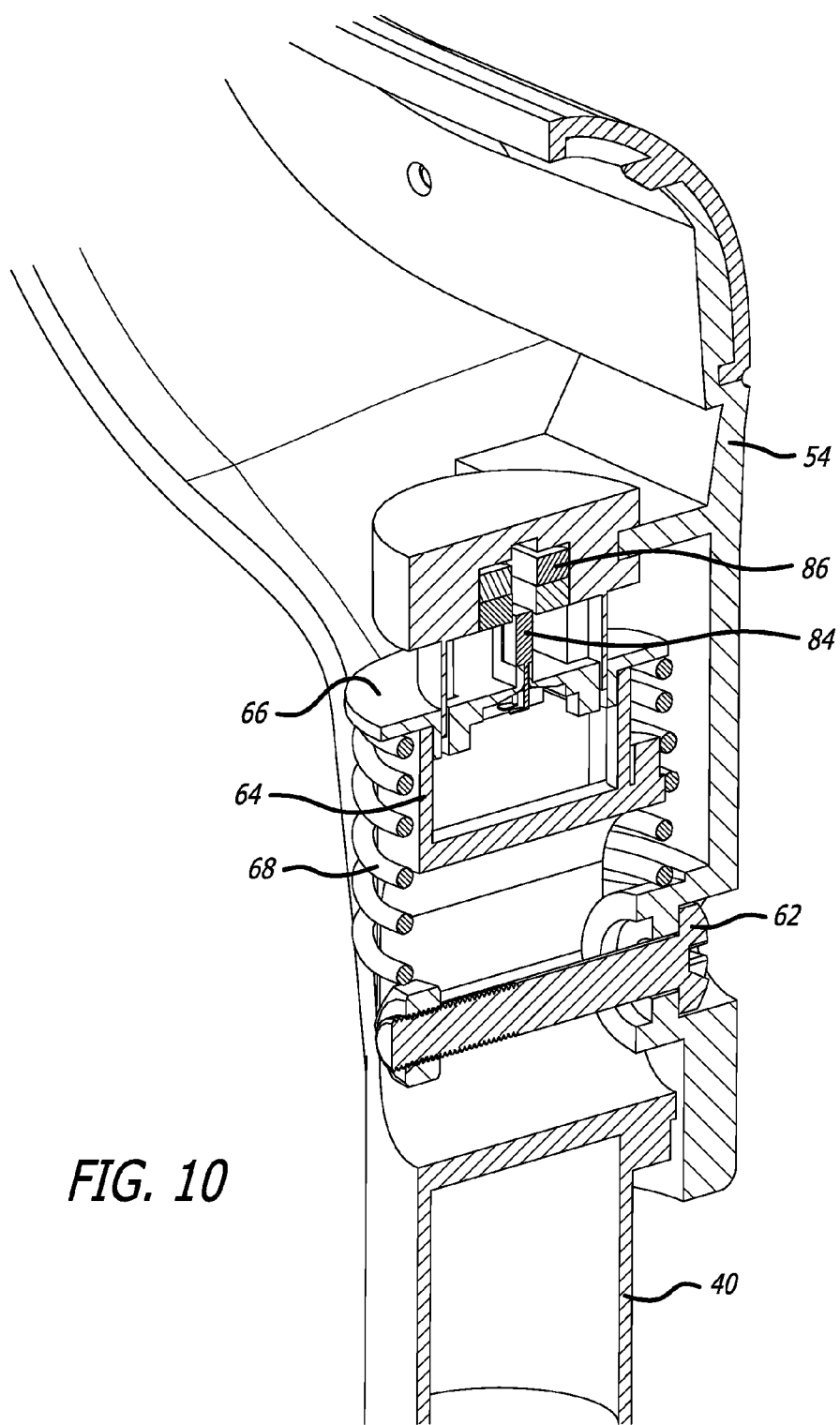
FIG. 10 is a partial cross-sectional perspective view of the input module of the handle as shown in FIG. 9 about lines 10-10.

In a preferred embodiment, the hand grip portion 54 of the handle 20 comprises a two-part clam shell structure that is fitted around the distal end of the inner handle tube 40 and which is able to move axially with respect to the inner handle tube 40. The two parts of the clam shell structure of the hand grip portion 54 are fixedly connected to each other via a plurality of fasteners to form a single hand grip 54 partially around the inner handle tube 40. The hand grip portion 54 is also movably connected to the distal end of the inner handle tube 40. As best shown in FIGS. 4A-11, the distal end of the inner handle tube 40 has a longitudinal slot 60. One or more fasteners 62 are fitted through the slot 60 and connected to the opposing portions of the hand grip portions 54 as shown in FIGS. 8 and 10. The fasteners 62 provide to prevent rotational movement of the hand grip 54 with respect to the inner handle tube 40, but allow for axial/longitudinal movement of the hand grip 54 with respect to the inner handle tube 40. A plug 64 is provided at the end of the inner handle tube 40. In one embodiment, a portion of the plug 64 is inserted into the central open portion of the inner handle tube 40 in a press fit manner. The plug 64 may also be fixed in place within the inner handle tube 40 with a set screw or some alternate fixing member. In one embodiment, the plug 64 has a flange 66 at a top of the plug 64 that extends past a perimeter of the inner handle tube 40. The flange 66 may have an irregular shape such that it assists in preventing rotational movement of the inner handle tube 40 with respect to the handle 20.

As shown in FIGS. 5A-10, in one embodiment a compression spring 68 is positioned in the handle 20. In one embodiment, one end of the compression spring 68 is fixed to or set against the fastener 62 that passes through the slot 60 in the inner handle tube 40, while the opposing end of the compression spring 68 is fixed against the flange 66 of the plug 64 at the top of the inner handle tube 40. The compression spring 68 operates to prevent outward axial movement of the hand grip 54 in the direction of the arrows in FIGS. 6 and 9 unless a sufficient force is applied to compress the spring 68. In one embodiment, the spring 68 is preloaded or pretensioned in place to eliminate any slop in the system. It is understood that the spring 68 could alternately be a tension spring, an elastomer spring, a plurality of belleville washers, etc., which is properly designed to provide a counter-force. There could also be multiple springs, symmetrically placed about the tube.

Figure 20:
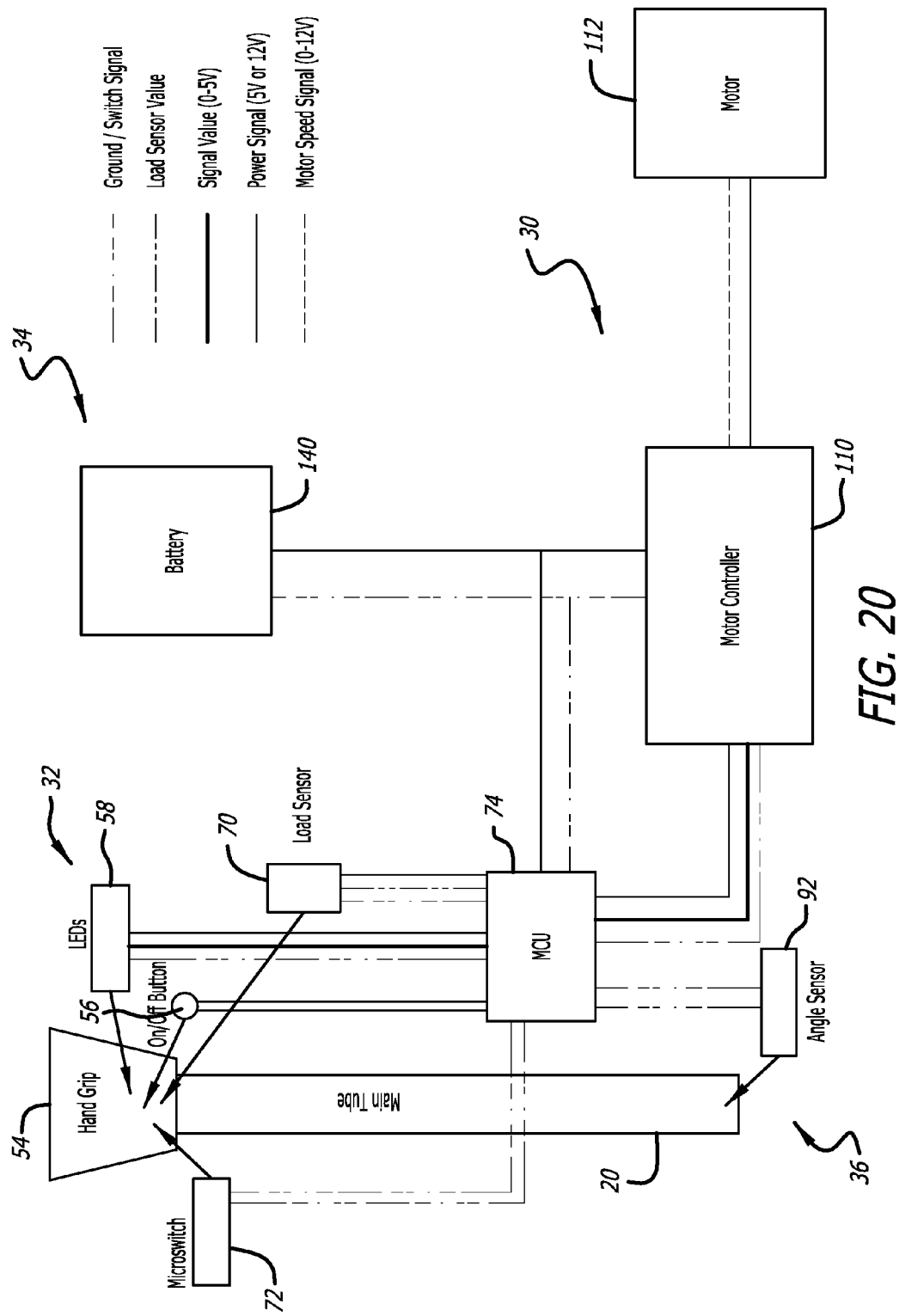
FIG. 20 is a schematic of one embodiment of a control system for the power assist wagon.

In a preferred embodiment, the handle 20 preferably houses a portion of the control system 32, a portion of which is referred to as the input module, for the power assist wagon 10. In one embodiment, as shown in FIG. 20, the control system 32 comprises a sensor 70, an on/off toggle switch 56, and a micro switch 72, each of which transmits signals to a microcontroller 74. The microcontroller 74 electrically communicates with the drive system 30, the power system 34, and the safety cut-off system 36. The microcontroller 74 also electrically communicates with the power supply and the battery indicator 58. While the sensor 70 is preferably housed in the handle grip 54, it is understood that it may be provided anywhere on the handle 20 that moves relative to the wagon body 12.

Figure 5A:
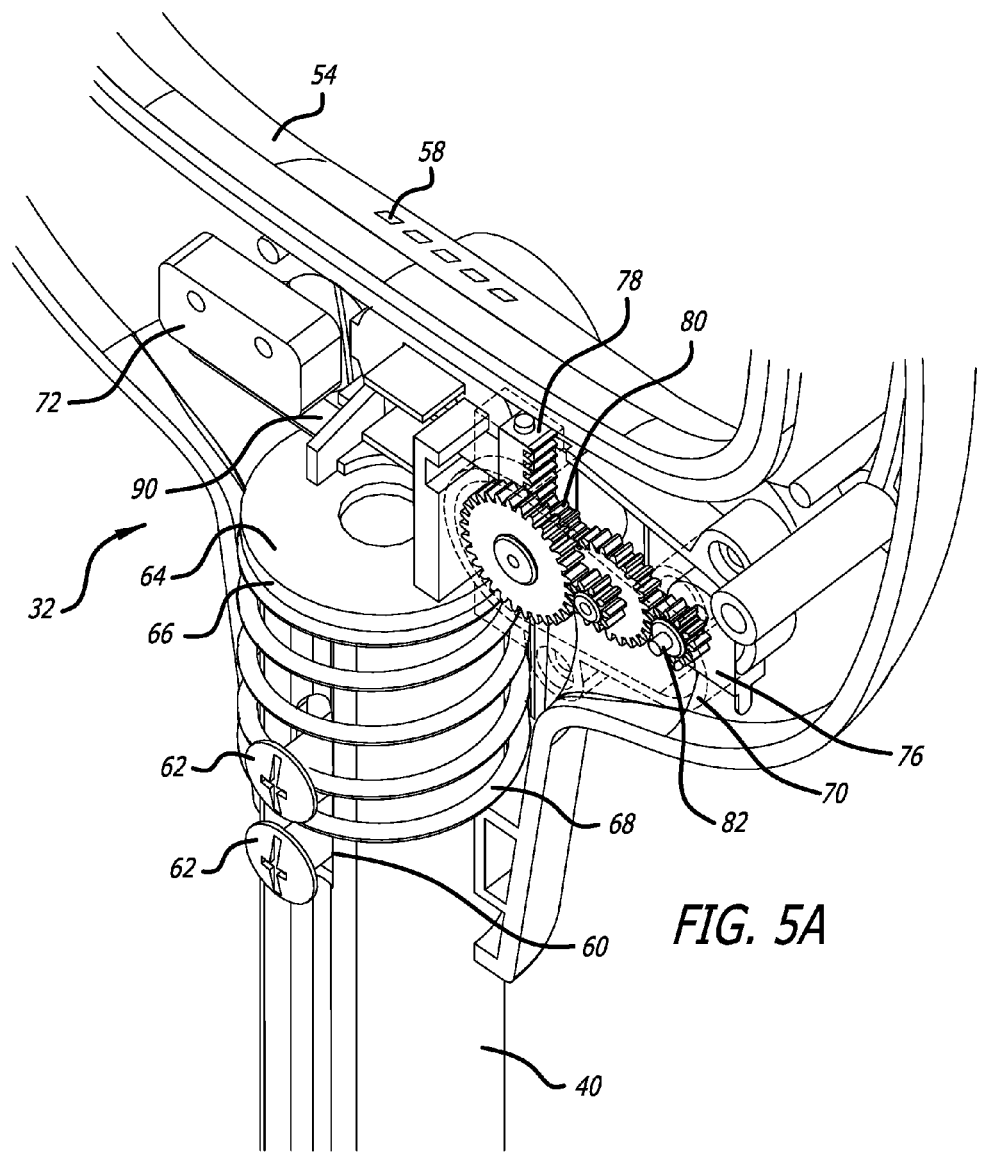
FIG. 5A is a partial perspective view of one embodiment of an input module in the handle of the power assist wagon.
Figure 5B:
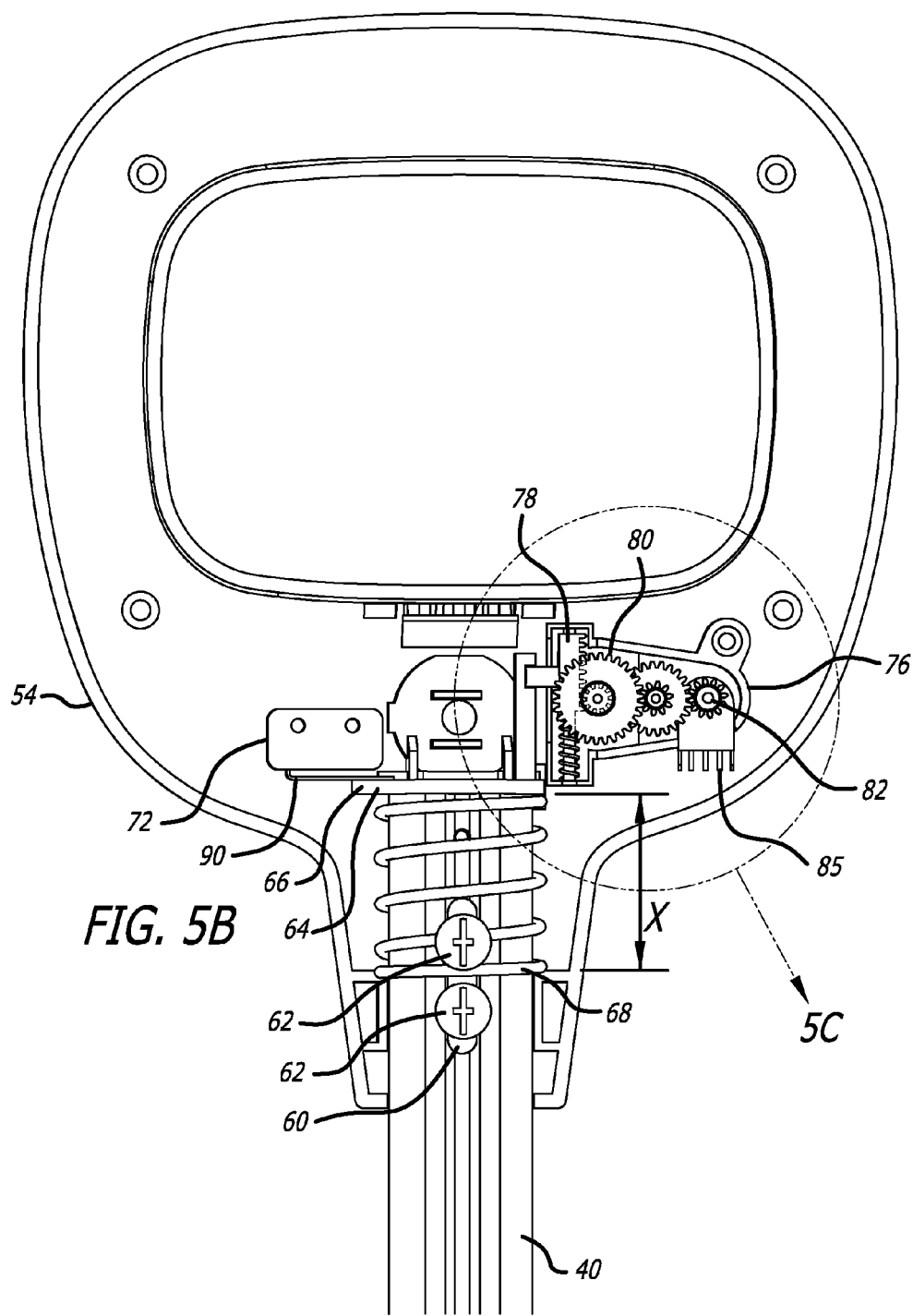
FIG. 5B is a front view of the input module in the handle of the power assist wagon of FIG. 5A, with the handle shown in the unactuated state.
Figure 5C:
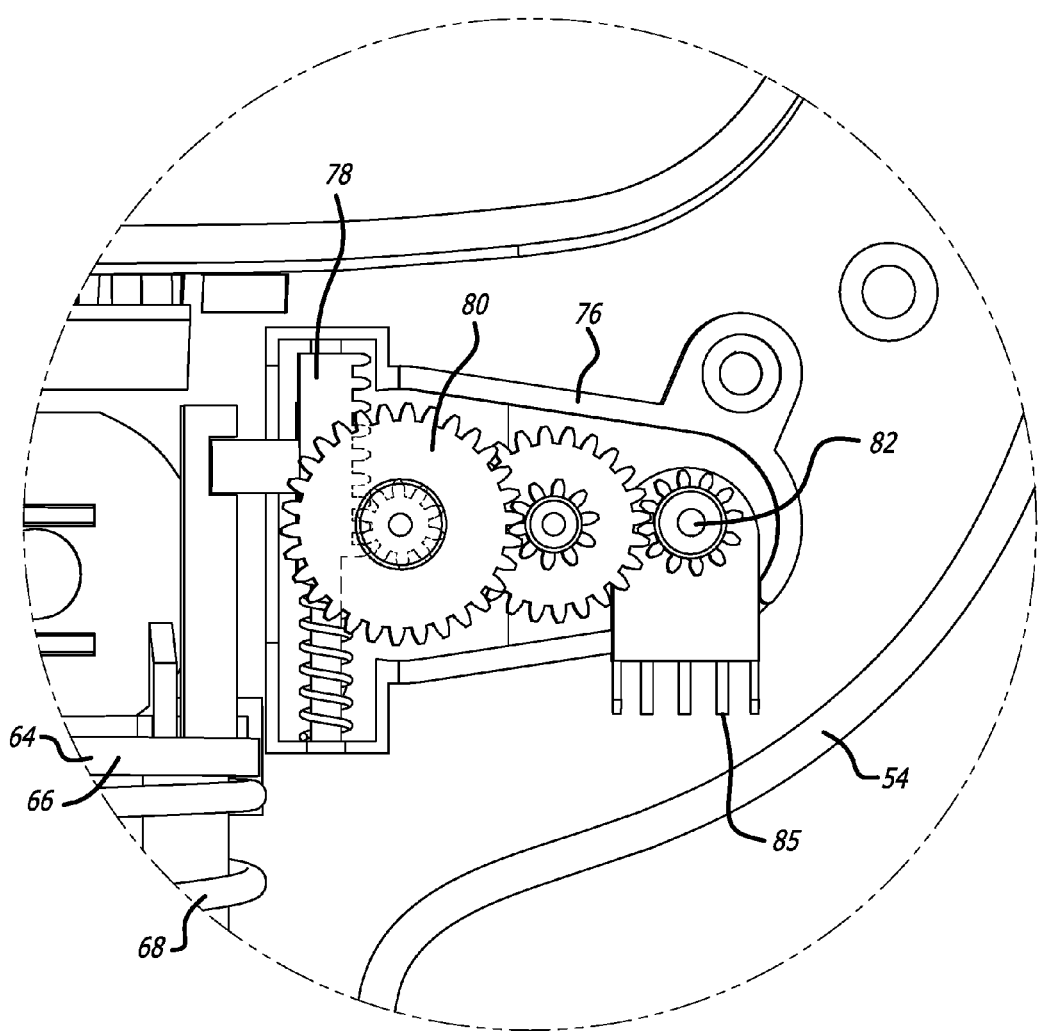
FIG. 5C is an enlarged view of a portion of the input module in the handle of the power assist wagon of FIGS. 5A and 5B.
Figure 6:
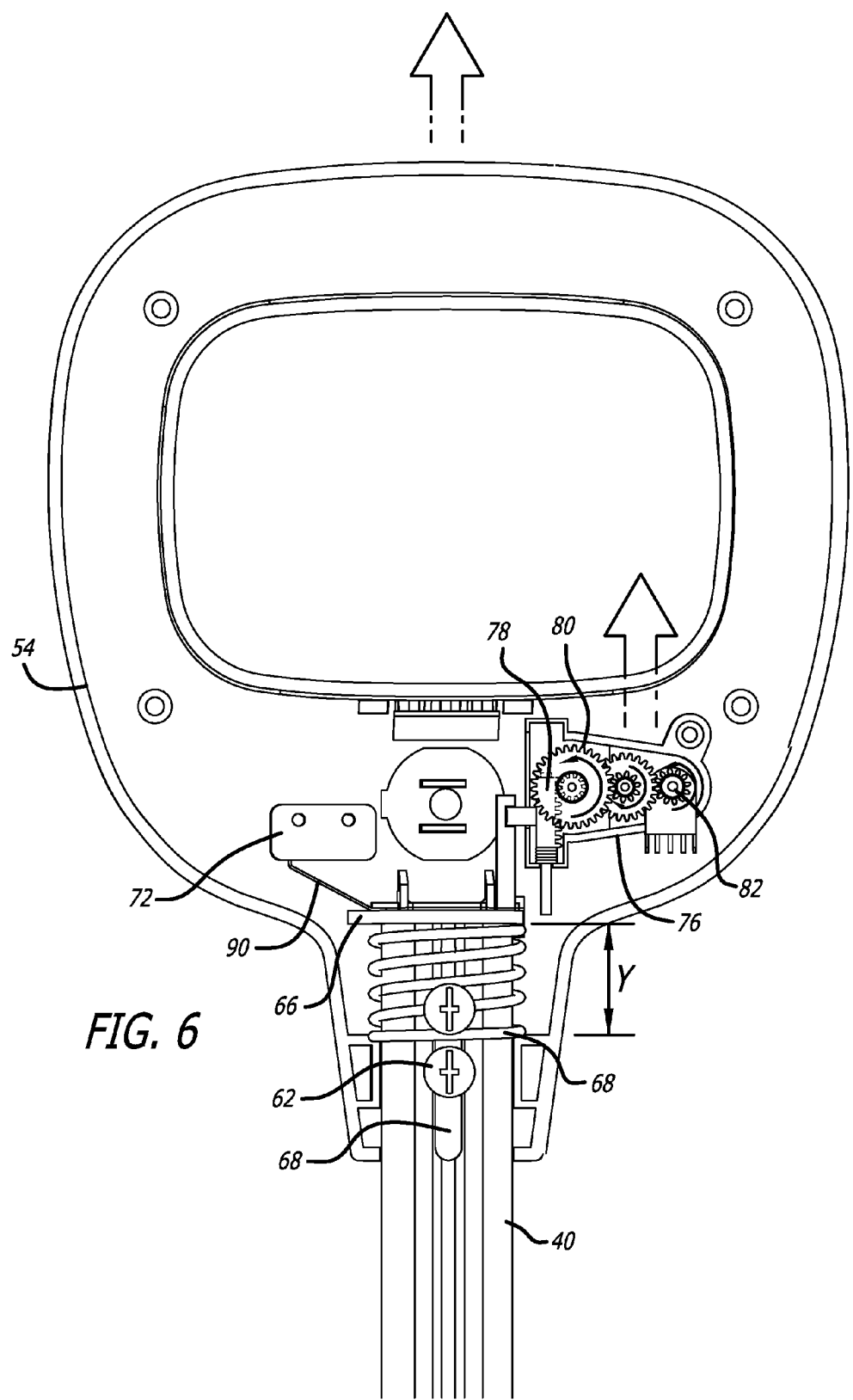
FIG. 6 is a front view of the input module in the handle of the power assist wagon of FIG. 5A, with the handle shown in the actuated state.

In one embodiment, as shown in FIGS. 5B-6, the sensor 70 in the handle grip 54 comprises an encoder 76 that is fixed to the handle grip 54. In the normal or unactuated state, i.e., when no force is being applied to the handle grip 54 or in the situation when a force is being applied to the handle grip 54 but the force is less than the force to compress the spring 68, the handle grip 54 will not move relative to the inner handle tube 40 (i.e., the handle tube 40 and the handle grip 54 will move together). Such an unactuated state of the handle grip 54 is shown in FIG. 5B. In this instance the distance from one end of the spring 68 to the opposing end of the spring 68 is "X." As the handle 20 is pulled against the movement of the wagon 10 (in the direction of the arrows in FIG. 6), if a force being applied to the handle grip 54 (i.e., the force pulling the handle 20 in the direction of the arrows in FIG. 6) is sufficient to compress the spring 68, the handle grip 54 and the encoder 76 will move axially with respect to the inner handle tube 40. One example of a situation where a sufficient force may be applied to the handle grip 54 to compress the spring 68 is when the wagon is loaded with two children and a parent is pulling the wagon up a hill. This will likely cause the force on the handle grip 54 to compress the spring 68. The greater the load on the handle grip 54, the more the spring 68 will be compressed and the greater the distance the handle grip 54 and the encoder 76 will move with respect to the handle tube 40. In one embodiment, the maximum distance the spring 68 can compress is approximately 6 mm. As shown in FIG. 6, the spring 68 is in the fully compressed state such that the distance between the two ends of the spring 68 is identified as being a distance "Y." In one embodiment, X−Y=approximately 6 mm, which equates to the maximum amount of travel of the handle grip 54 with respect to the handle tube 40. In a preferred embodiment the spring constant of the spring 68 is approximately 120 lbs/in. Accordingly, because the spring 68 is pretensioned, the spring 68 will begin to compress upon the application of a very low force, for example approximately 0.5 lbs. of force, and will compress the full 6 mm upon approximately 30 lbs. of force. As the handle grip 54 and encoder 76 move axially with respect to the inner handle tube 40, a linear gear 78 connected to the plug 64 in the inner handle tube 40 and further contacting the gears 80 in the encoder 76 causes the gears 80 in the encoder 76 to rotate, as shown best in FIG. 5C, because the encoder gears 80 engage the linear gear 78. When the encoder gears 80 rotate, a shaft 82 within the encoder 76 that is rotationally connected to the encoder gears 80 also rotates, thereby providing an encoder output that can be read by the microcontroller 74. The distance the hand grip 54 moves linearly relative to the inner handle tube 40 is a direct and proportional relationship to the number of degrees the encoder shaft 82 rotates. When the encoder shaft 82 is spun zero degrees (i.e., meaning there is no movement of the handle grip 54 relative to the inner handle tube 40), the microcontroller 74 reads a value of zero from the encoder 76. Conversely, when the handle grip 54 is pulled and translated the maximum 6 mm relative to the inner handle tube 40, the spring 68 is also compressed 6 mm, the encoder shaft 82 is spun a certain number of degrees, and the microcontroller will read the maximum value from the encoder 76, which in one embodiment is a value of 48. In one embodiment, the encoder value that the microcontroller 74 obtains from the encoder are values from 0 to 48, which are directly proportional to the distance the handle grip 54 is pulled relative to the inner handle tube 40. Accordingly, in one embodiment the system provides a numerical value from 0 to 48 to the microcontroller 74 corresponding to the force the user is pulling on the handle grip 54. The numerical value determined by the encoder is obtained by the microcontroller 74 and is one of the variables in the control algorithm used to calculate a signal, such as a pulse width modulation signal, from the motor controller to the motor. While not shown, wires extend from the output terminals 85 of the encoder and down the middle of the handle tubes 38, 40 to the wiring harness 88 shown in FIG. 19A.

While an encoder is one sensor that may be used to determine the distance moved by the hand grip 54, another method is with the use of a hall effect sensor. Referring to FIGS. 7-10, in an alternate embodiment a hall effect sensor 84 is the sensor 70 utilized in the control system. The hall effect sensor 84 outputs a varying voltage based on the proximity of the sensor 84 to magnets 86. As is understood by those of skill in the art, the orientation of the sensor 84 as well as the number, strength and orientation of the magnets 86 affects the output of the sensor 84, e.g., resolution, accuracy, linearity, etc. The hall effect sensor 84 outputs an absolute analog voltage based on the position of the sensor 84 relative to the magnets 86, and sends the analog voltage to the microcontroller 74. The microcontroller 74 will measure the change in voltage from zero to determine the position of the hand grip 54 relative to the inner handle tube 40. An analog to digital converter in the microcontroller 74 converts the voltage into a digital signal input that will be sent to the control algorithm as described herein.

As best shown in FIGS. 8 and 10, in this alternate embodiment, the same inner handle tube 40 is provided with a slot 60 and the inner handle tube 40 is movably fixed to the handle grip 54 to allow for movement of the handle grip 54 with respect to the handle tube 40, but to prevent rotational movement therebetween. Similarly, the plug 64 with a flange 66 is provided within at the interior top of the inner handle tube 40, however no linear gear is needed. The compression spring 68 is pretensioned between the fastener 62 and the flange 66 of the plug. The hall effect sensor 84 is secured to the top of the plug 64, and a plurality of magnets 86 are connected and fixed in place to the handle grip 54. Accordingly, the hall effect sensor 84 remains fixed in its location with respect to the handle inner handle tube 40, and the magnets 86 remain fixed in place with respect to the handle grip. Further, the magnets 86 move with the handle grip 54 as the handle grip 54 is forced away from the handle inner handle tube 40 (compare FIGS. 7 and 8 with FIGS. 9 and 10). In the normal or unactuated state, i.e., when no force is being applied to the handle grip 54 or in the situation when a force is being applied to the handle grip 54 but the force is less than the force to compress the spring 68, the handle grip 54 will not move relative to the inner handle tube 40 (i.e., the handle tube 40 and the handle grip 54 will move together). Such an unactuated state of the handle grip 54 is shown in FIGS. 7 and 8. In this instance the distance from one end of the spring 68 to the opposing end of the spring 68 is "X." As the handle 20 is pulled against the movement of the wagon 10 (in the direction of the arrows in FIG. 9), if a force being applied to the handle grip 54 (i.e., the force pulling the handle 20 in the direction of the arrows in FIG. 9) is sufficient to compress the spring 68, the handle grip 54 and the magnets 86 will move axially with respect to the inner handle tube 40. The greater the load on the handle grip

54, the more the spring 68 will be compressed and the greater the distance the handle grip 54 and the magnets 86 will move with respect to the handle tube 40. In one embodiment, the maximum distance the spring 68 can compress when utilizing the hall effect sensor is approximately 2.5-3.0 mm. As shown in FIGS. 9 and 10, the spring 68 is in the fully compressed state such that the distance between the two ends of the spring 68 is identified as being a distance "Y." In one embodiment, X−Y=approximately 6 mm. As the handle grip 54 and magnets 86 move axially with respect to the inner handle tube 40, the hall effect sensor 84 provides a changing absolute analog voltage output to the microcontroller 74. The distance the hand grip 54 moves linearly relative to the inner handle tube 40 is, theoretically, generally a direct and proportional relationship to the voltage output sent by the hall effect sensor 84 to the microcontroller 74. The voltage output sent by the hall effect sensor 84 to the microcontroller 74, or obtained by the microcontroller 74 from the hall effect sensor 84, is one of the variables in the control algorithm used to calculate a signal, such as a pulse width modulation signal, from the motor controller to the motor. While not shown, wires extend from the output terminals of the hall effect sensor 84 down the middle of the handle tubes 38, 40 to the wiring harness 88 shown in FIG. 19A. Alternate types of sensors 70 to detect force include potentiometers, optical encoders, ultrasonic sensors, proximity sensors, strain gauges, accelerometers, etc. The voltage output value sent by the hall effect sensor 84 to the microcontroller 74 is used in the control algorithm to control the motor.

Referring to FIGS. 5A through 10, in various embodiments the control system 32 also comprises a micro switch 72, such as a momentary micro switch, within the handle grip 54. The micro switch 72 is fixedly connected within the handle grip 54. The micro switch 72 has a switch 90 extending therefrom that engages the top of the flange 66 of the plug 64. When no axial force is applied to the hand grip 54, or an axial force less than a force that is required to compress the spring 68 is applied to the hand grip 54, the switch 90 does not move from the closed position and the micro switch 72 remains closed (see FIGS. 5B and 7). When an axial force greater than a force that is required to compress the spring 68 is applied to the hand grip 54, the hand grip 54 will translate axially outward or away relative to the handle inner handle tube 40 and the switch 90 on the micro switch 72 will open (see FIGS. 6 and 9). Similarly, when the axial force greater than the force required to compress the spring is removed from the hand grip 54, the hand grip 54 will translate axially back toward the handle inner handle tube 40 and the switch 90 on the micro switch 72 will close again. The microcontroller 74 will obtain a signal of open or closed from the micro switch 72 depending on the state of the switch 90 of the micro switch 72. The state of the switch 90 of the micro switch 72 is another variable in the control algorithm used to calculate a signal, such as a pulse width modulation signal, from the motor controller to the motor. Additionally, in a preferred embodiment, the micro switch 72 operates to provide a zero state value for calibration purposes during every instance that the handle grip 54 returns to the normal/unactuated state. For example, with a hall effect sensor 84 as the sensor 70 in the handle grip 54, the micro switch 72 will set or calibrate the zero voltage position of the hall effect sensor with the microcontroller 74 ever time the handle grip 54 is released and returned to the unactuated state. Similarly, with an encoder 76, the micro switch 72 will set or calibrate the zero value for the encoder 76 with the microcontroller 74 every time the handle grip 54 is released and returned to the unactuated state. For example, if the micro switch is closed (i.e., the hand grip is not being pulled), the control algorithm will operate to have the motor controller send a signal to the motor that slows down the motor to a stop. Conversely, if the micro switch is open (i.e., the hand grip is being pulled a given amount over the threshold value), the microcontroller sees the sensor 70 output as an input for the control algorithm (e.g., an input to the PID algorithm) to calculate the pulse width modulation value for the motor controller to send to the motor.

Figure 12B:
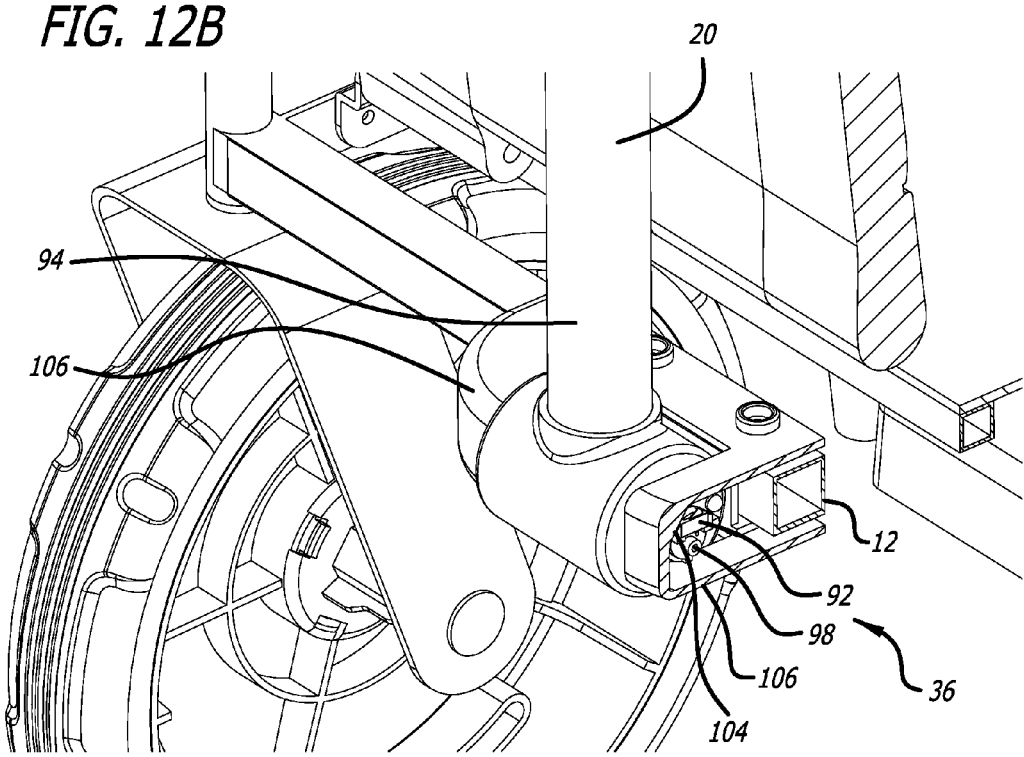
FIG. 12B is a perspective view of the connection assembly between the handle and the wagon frame of FIG. 12A, with the exterior cap attached, but including a partial cross-section through the cap and mounting components.
Figure 12C:
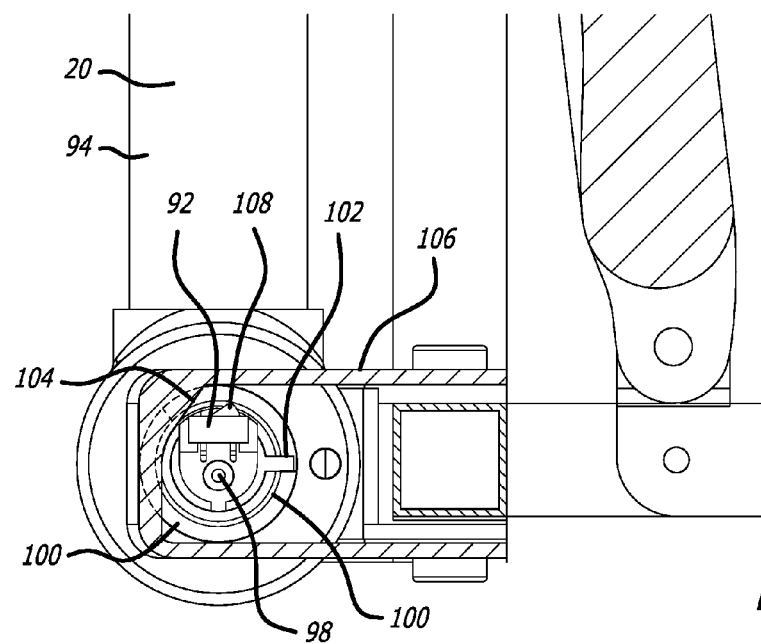
FIG. 12C is a partial side view of the cross-sectional view of the connection assembly between the handle and wagon frame of FIG. 12B, with the handle in the vertical orientation.
Figure 12D:
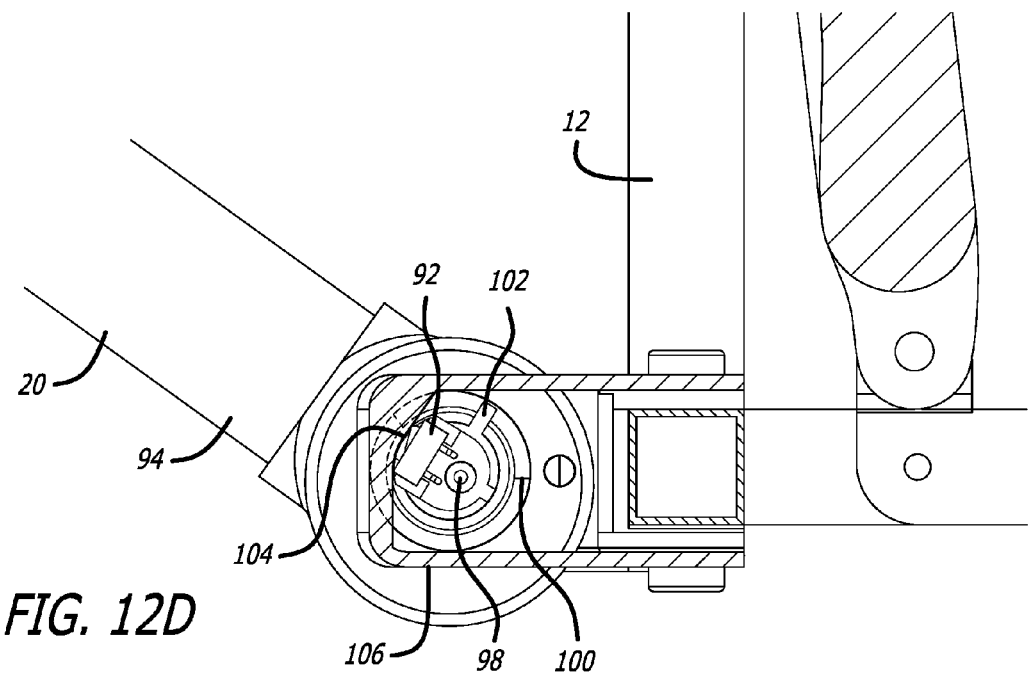
FIG. 12D is a partial side view of the cross-sectional view of the connection assembly between the handle and wagon frame of FIG. 12B, with the handle lowered from the vertical orientation.
Figure 12E:
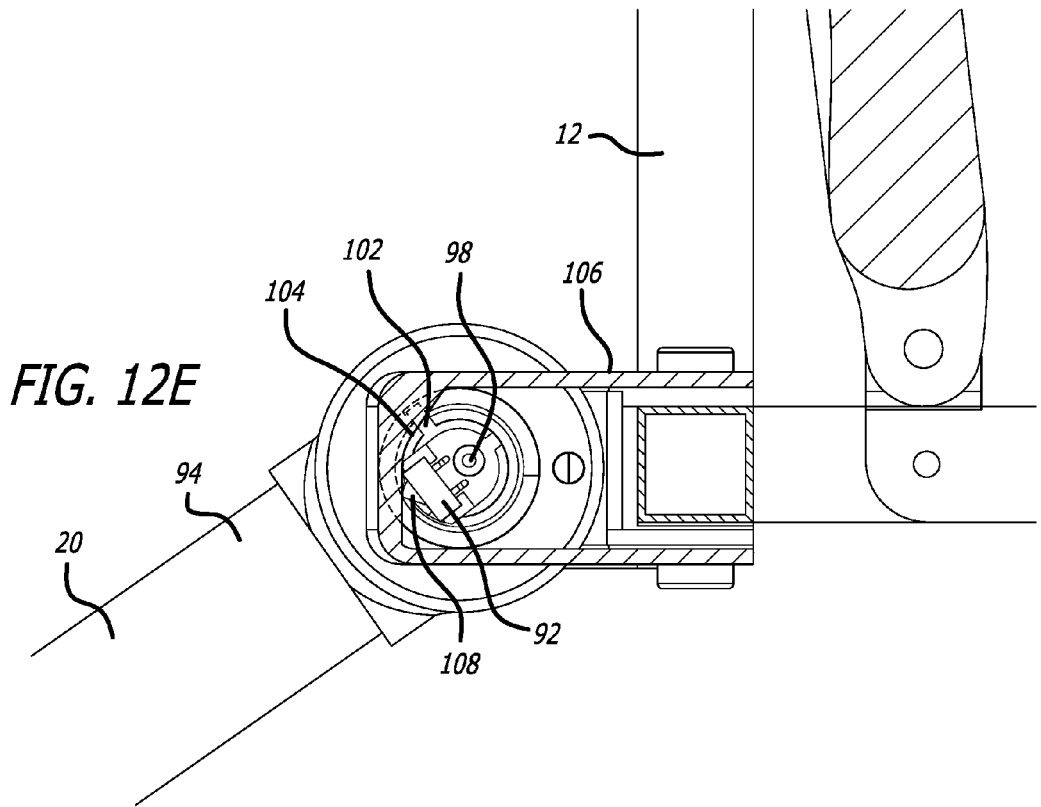
FIG. 12E is a partial side view of the cross-sectional view of the connection assembly between the handle and wagon frame of FIG. 12B, with the handle lowered from the vertical orientation further than the orientation in FIG. 12D.
Figure 13:
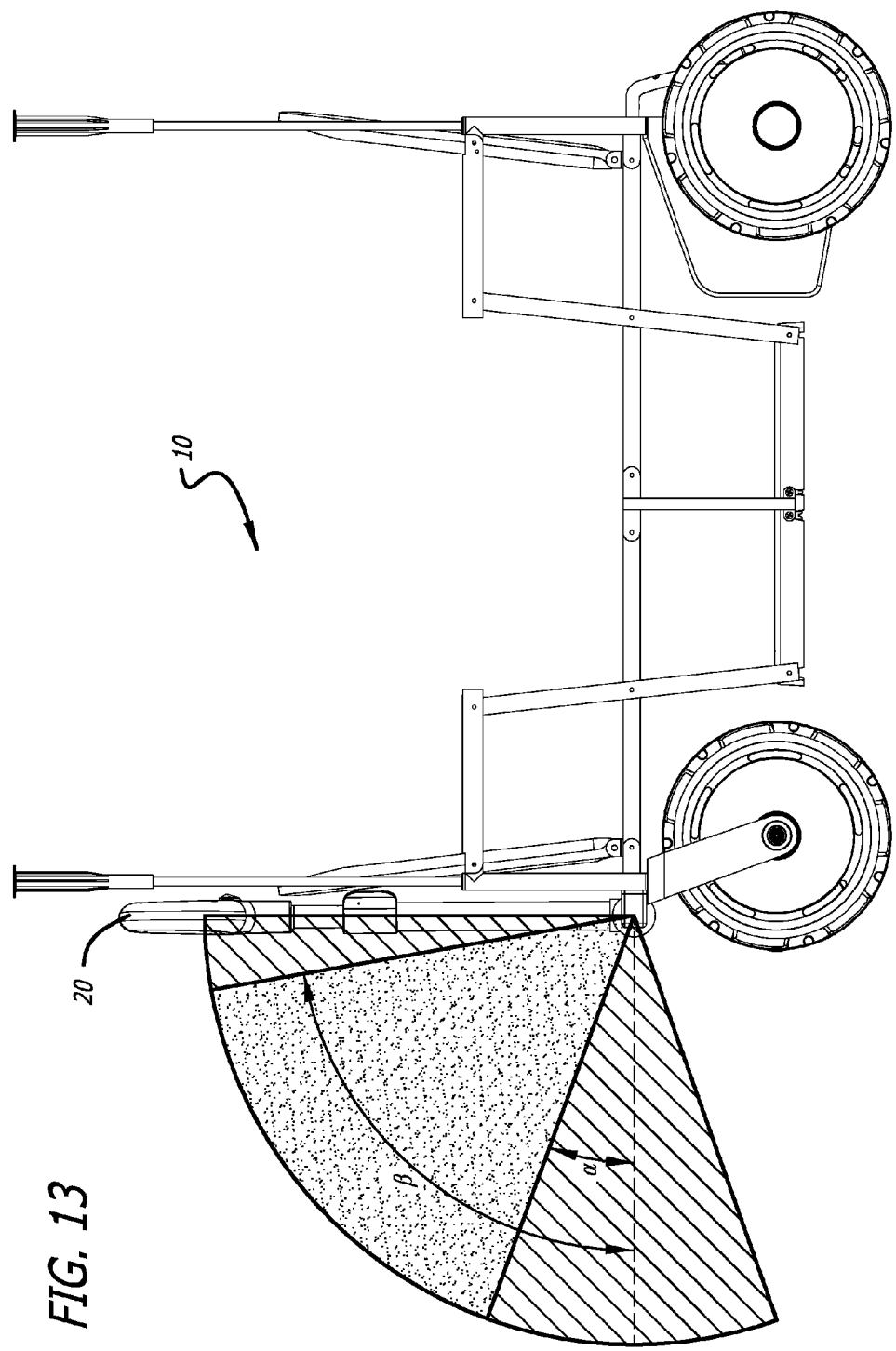
FIG. 13 is a side view of one embodiment of the power assist wagon, showing the range of angular movement of the handle according to one embodiment.

The power assist wagon 10 may also comprise a safety cut-off system 36. One embodiment of the safety cut-off system 36 is connected to the handle 20 and is shown in FIGS. 12A-13. In one embodiment, the safety cut-off system 36 comprises another sensor 92, such as a micro switch or a momentary pushbutton switch connected to the handle 20 that senses when the handle 20 is in the allowable operating range of the handle 20. For example, if the handle 20 is within the allowable angle range for usage, the microcontroller 74 will be allowed to obtain signals from the sensor 70 in the control system for input into the control algorithm. If the handle 20 is outside the allowable range for usage, the microcontroller 74 will have the motor controller in the drive system 30 send a zero voltage signal to the motor to prevent movement of the motor. With brushless motors, the safety mechanism may intentionally "short" the motor signal wires to create a braking action as well as a zero volt signal when the micro switch is open. The relay connecting the motor signal wires may also turn off, which would prevent any signal from reaching the motor, or a mechanical brake could also be applied when the wagon is off or the handle not in the safe angle range.

In a preferred embodiment, the handle 20 has a proximal end 94 that is pivotally connected to the wagon body 12. As shown in FIG. 12A, in one embodiment a bracket 96, such as a U-shaped bracket 96 is connected to the wagon body 12. In such an embodiment, the proximal end 94 of the handle 20 is pivotally connected to the U-shaped bracket 96 about an axis of the handle 20. An axle 98 that is transverse to a longitudinal axis of the handle 20 and which engages the bracket 96 may be provided at the proximal end 94 of the handle 20 to provide for the pivoting motion of the handle 20 with respect to the bracket 96 connected to the wagon body 12. In a preferred embodiment, the bracket 96 may have stops 100 provided on an outer surface of the bracket 96, and a protrusion 102 may extend from the axle 98 to engage the stops 100 at both extreme ends of the allowable pivoting motion of the handle 20. With reference to FIGS. 12C, 12D and 13, the total range of movement of one embodiment of the handle 20 is illustrated. For example, when the handle 20 is pivoted upwardly as shown in FIGS. 12C and 13 the protrusion 102 extending from the axle 98 will engage one of the stops 100 at approximately the 90° location of the handle 20 to prevent the handle 20 from extending further toward the wagon body 12. Similarly, another stop 100 may be provided to prevent the handle 20 from hitting the ground as shown in FIGS. 12E and 13, such as at some angle below the horizontal, for example approximately 20° below the horizontal. Within the full range of motion of the handle 20 as shown in FIG. 13, there is a range of motion of the handle 20 where the drive system 30 is operable and a range of motion of the handle 20 where the drive system is not operable. Referring to FIG. 13, the operable range in motion of one embodiment of the handle 20 is from an angle α that is approximately 20° from the horizontal axis to an angle β that is approximately 80° from the horizontal axis. By providing that the handle 20 must be at an angle greater than 20° from the horizontal axis helps to prevent a small child from activating the drive system 30. Similarly, if the angle of the handle 20 is greater than β the microcontroller 74 will not allow the drive system 30 to operate as another safety measure to prevent the user from sitting in the wagon and activating the drive system 30 and also to prevent the drive system 30 from engaging when the wagon 10 is being lifted upwardly by the user. However, if the angle of the handle 20 is less than β but greater than α, the microcontroller 74 will allow the drive system 30 to operate if a sufficient force is measured by the sensor 70 in the handle 20. Additionally, there may be a spring pin to create a small force for the user to overcome to pivot the handle downward and prevent the handle from falling toward the ground unintentionally.

In one embodiment, actuation of the micro switch sensor 92 is provided by a cam 104 in the interior of a housing 106 encasing the micro switch sensor 92 and pivot mechanism of the handle 20. The cam 104 is best shown in FIG. 12A. The cam 104 engages a switch 108 on the micro switch sensor 92 during certain angular positions of the handle 20. Referring to FIG. 12C, the handle is at the 90° orientation and the switch 108 is open and not engaged by the cam 104. As the handle 20 is rotated downwardly within the operable range of motion of the handle 20, as shown in FIG. 12D, the cam 104 engages the switch 18 to close the switch 108. Finally, if the handle 20 is dropped below the operable range of motion, as shown in FIG. 12E, the cam 104 disengages from the switch 108 and the switch 108 opens again. As explained above, the state of the micro switch sensor 92 of the safety cut-off system 36 is another variable that the control algorithm in the microcontroller 74 utilizes to calculate a signal that is sent from the motor controller to the motor. Alternately, an angle sensor that detects the angle of the handle 20 and provides a signal of the angle of the handle 20 to the microcontroller 74 may be utilized. The angle signal may also act as an input variable to the control algorithm. Various types of angle sensors include potentiometers, proximity sensors, limit switches, etc.

As explained above, to provide the propulsion, the power assist wagon 10 includes a drive system 30. The drive system 30 preferably provides a rotational force to the drive wheel 16. One embodiment of a drive system 30 is shown in FIGS. 14A-14C. Referring to FIGS. 14A and 20, in one embodiment the drive system 30 includes motor controller 110, a motor 112 having a pinion gear 114, a gear box 116, an output member 118 and a power transfer member 120. A gear box housing 122 may also be provided around the gear box 116 for safety purposes to prevent access to the gears in the gear box 116. The motor controller 110 receives signals from the microcontroller 74 and transmits voltages to the motor 112 to operate the motor 112. While the motor controller and microcontroller have been explained as separate components, the motor controller may be integrated into the microcontroller.

In a preferred embodiment the preferred motor 112 for the drive system 30 is a PMDC or permanent magnet direct current motor, however, other types of motors may be utilized in the wagon 10. Some of the benefits of a PMDC motor 112 are that the PMDC motor is fairly inexpensive, it provides a fairly constant speed which may eliminate the need for a clutch system, it may be able to be coupled directly to the rear wheel 16, and it provides very minimal resistance when the wagon 10 is pulled in a non-power assist mode. One type of PMDC motor 112 that may be utilized is either a 12 volt or 24 volt direct current motor, with a speed of approximately 3500 rpm.

As shown in FIG. 14A, in a preferred embodiment the motor 112 is located within the wagon body 12, and most preferably within and supported by a bin 124 at the rear of the wagon body 12. The rear axle 18 is supported by the wagon frame 26 of the wagon body 12, preferably in a fixed manner so that the rear axle 18 does not rotate. The gear box 116 may also be supported coaxially by the rear axle 18. Preferably, the pinion gear 114 output of the motor 112 engages the gear box 116. In a preferred embodiment, the output member 118 at the exit of the gear box 116 rotates at approximately a 1:25 ratio of the rotation of the pinion gear 114. The output member 118 has a plurality of fingers 126 that engage with receivers 128 in the power transfer member 120 to transfer rotation of the output member 1:1 with the power transfer member 120. Further, the power transfer member 120 is connected to the drive wheel 16 in a 1:1 manner so that the wheel 16 rotates at a 1:1 ratio with the output member 118 of the drive system 30. As shown in FIG. 14B, the drive wheel 16 has a plurality of ribs 130 that engage a plurality of grooves 132 in the power transfer member 120 to transfer rotational motion of the power transfer member 120 to the drive wheel 16. Additionally, a bushing member 134 having a plurality of external surfaces is rotationally fixed within a mating bore 136 in the drive wheel 16. The bushing member 134 has a bore 138 through which the rear axle extends to rotationally support the drive wheel 16 on the rear axle 18. Alternately, other power transmission mechanisms may be used to transmit power from the motor 112 to the rear wheel 16, including, for example, a belt drive or chain drive between the motor drive shaft and the rear drive wheel 16. In the preferred embodiments, the rear wheel 16 is a driven wheel through its mechanical connection with the motor drive shaft, and the rear wheel 16 is able to rotate freely on the rear axle 18. In an alternate embodiment the rear axle 18 may be driven by the motor 112, and the rear wheel 16 may be fixed, such as by keying, to the rear axle 18 such that rotation of the rear axle 18 causes rotation of the rear wheel 16.

Figure 15:
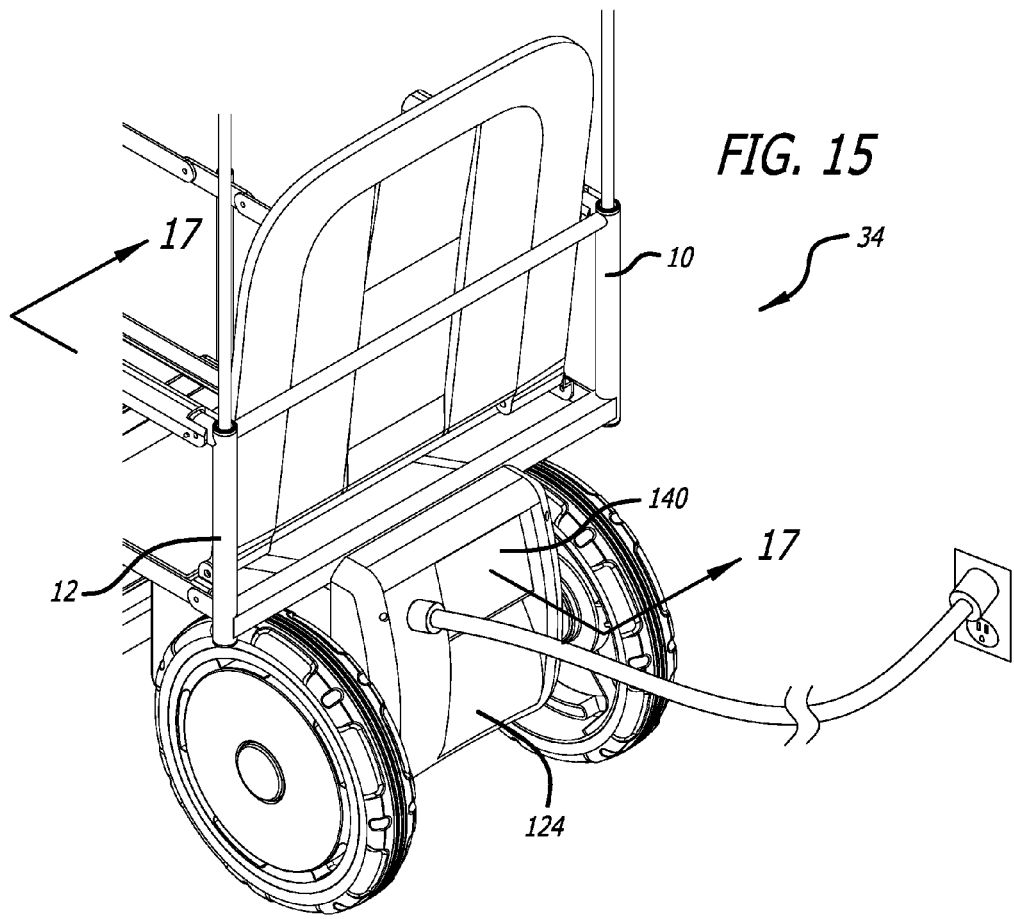
FIG. 15 is a perspective view showing one embodiment for charging a battery for a power assist wagon.
Figure 17:
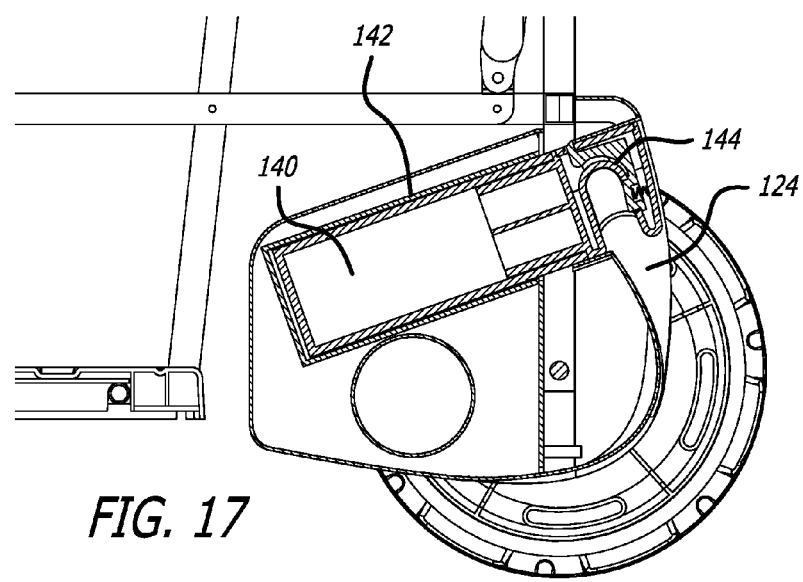
FIG. 17 is a partial cross-sectional view of one embodiment of a battery housing member for a power assist wagon.
Figure 16:
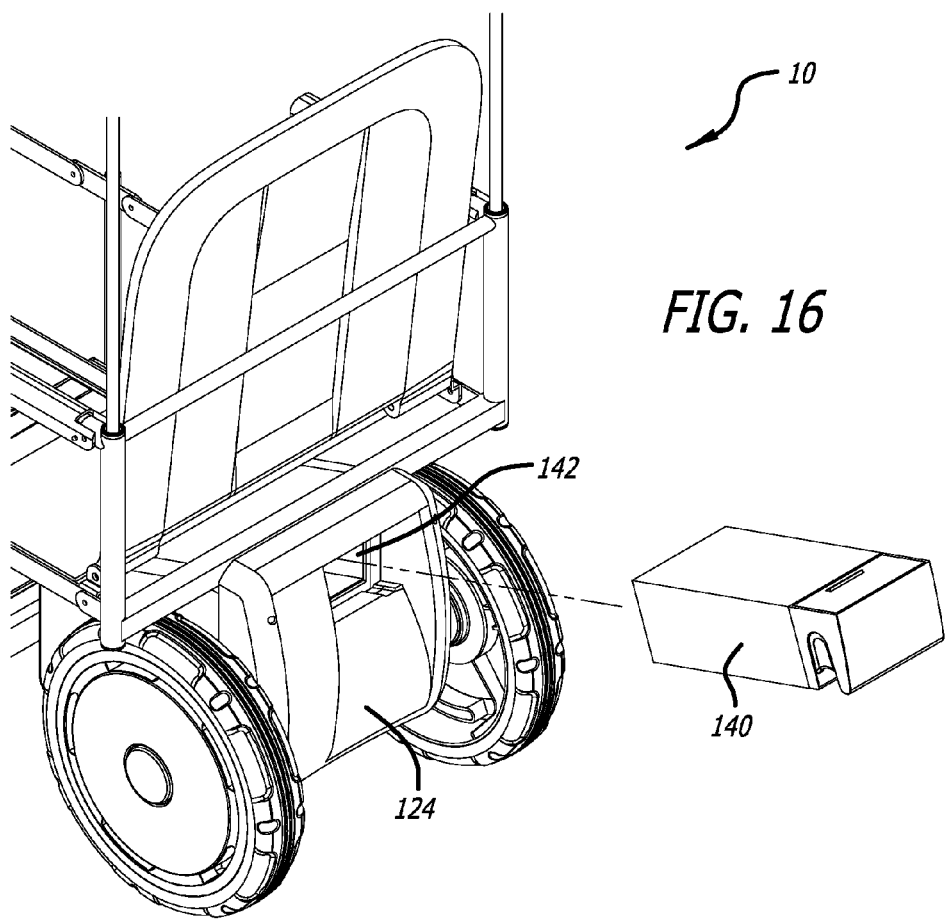
FIG. 16 is a perspective view showing the removal and insertion for a battery in one embodiment of a power assist wagon.
Figure 18:
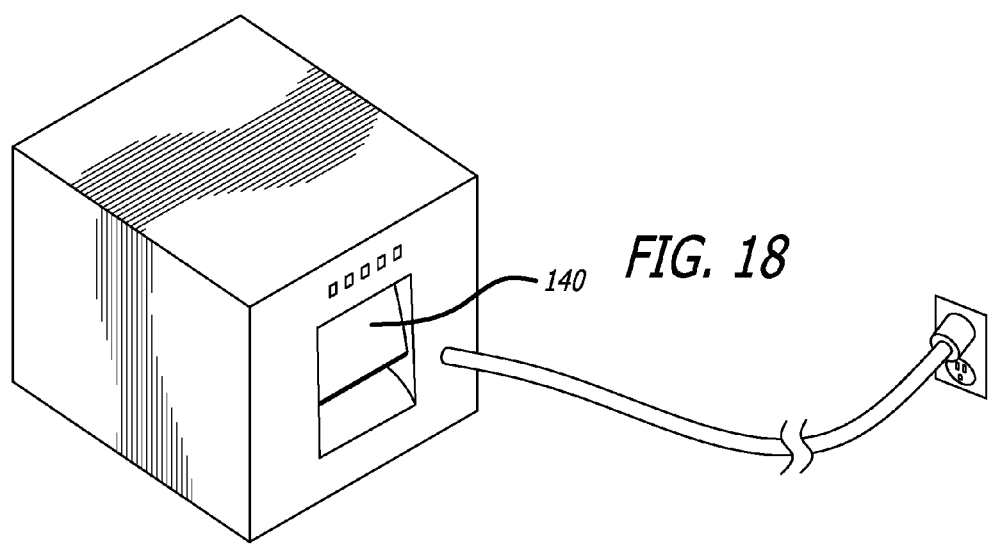
FIG. 18 is a perspective view of one embodiment of an auxiliary charging housing for a battery for a power assist wagon.

Referring to FIGS. 15-20, one embodiment of the power system 34 is illustrated. As shown, in one embodiment the power system 34 includes a rechargeable battery 140, which may, for example, be a 12 volt or 24 volt lithium ion or lead acid battery. In a preferred embodiment the battery 140 is also located within the wagon body 12, and is preferably positioned within a battery receiver 142 in the rear bin 124. Terminals (not shown) are provided in the rear bin 124 to electrically connect the battery 140 to the control system 32, as schematically illustrated in FIG. 20. The battery 140 may be charged when docked in the battery receiver 142 in the rear bin 124 as shown in FIG. 15. In a preferred embodiment, the battery 140 has a spring-loaded release member 144 that can be actuated to release the battery 140 from connection with the battery receiver 142 for removal of the battery 140, as shown in FIGS. 16 and 17. The battery 140 may alternately be docked in an auxiliary charger, as shown in FIG. 18, for charging when removed from the wagon 10.

Figure 19A:
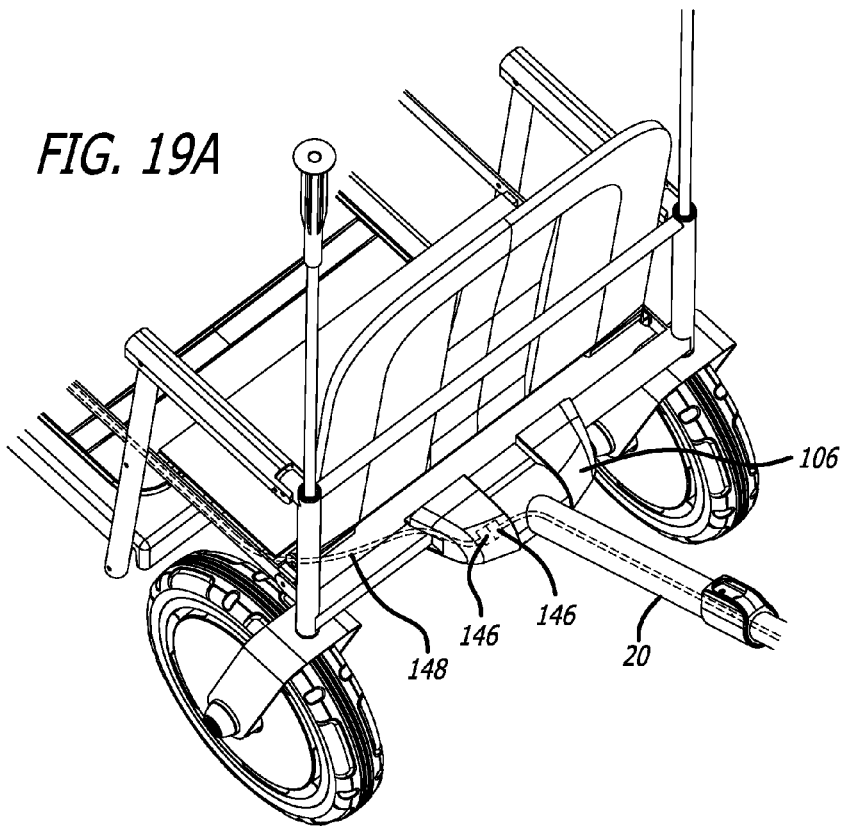
FIG. 19A is a partial perspective schematic view illustrating the wiring connection at the front of the wagon according to one embodiment.
Figure 19B:
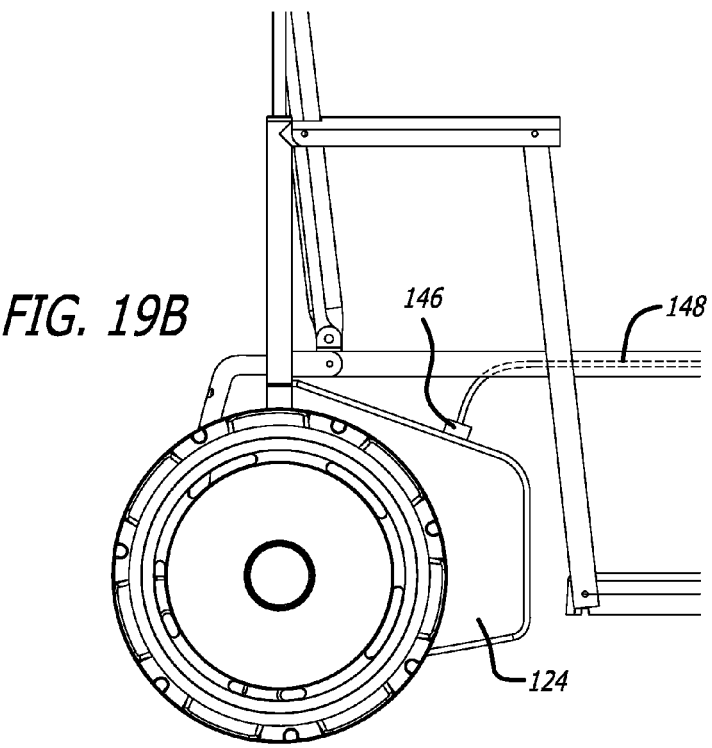
FIG. 19B is a partial side schematic view illustrating the wiring connection at the rear of the wagon according to one embodiment.

As shown in FIGS. 19A, 19B and 20, wires run from various electrical components to the microcontroller 74. The wires from the sensor 70 and micro switch 72 run down the center of the handle 20 and join with the wires from the micro switch sensor 92 in the safety cut-off system 36 and preferably culminate in a quick release connector 146, preferably located behind the housing 106 at the proximal end of the handle 20. A wiring harness 148 extends from the front of the wagon 10 to the rear of the wagon 10. The wiring harness 148 typically extends through the wagon body 12, and if the wagon body 12 includes a fabric shell 28, it may extend through a sleeve (not shown) in the wagon shell 28. The wiring harness 148 preferably has a quick release connector at one end to connect to the quick release connector at the handle, and another quick release connector at the second end to connect to a quick release connector extending from the bin at the rear of the wagon 10. The wire that is in the telescoping tube should either be extremely flexible or retractable in order to accommodate the changing size of the handle. Similarly, the wire that extends through the body of the wagon must also be flexible to accommodate for folding of a folding wagon.

With reference to FIG. 11, there is preferably no motor output until the handle force signal reaches a minimum load, also referred to as a set point. Once the minimum load is reached, meaning that the user is applying a force to the handle 20 equal to or greater than the minimum load, the microcontroller and motor controller will operate to have the motor provide an output. An output is also calculated/provided when the force is below the minimum load. For example, if the motor output is greater than zero and the force is below the setpoint, the microcontroller is still operating to have the motor provide an output that is lower than the previously calculated output. The microcontroller and motor controller adjusts that motor output (voltage, duty cycle) in an attempt to maintain the handle force signal about a set point. In one embodiment a PID (proportional-integral-derivative) loop is the control algorithm used by the microcontroller to control the signal to the motor controller and ultimately the motor. The PID controller or loop is a control loop feedback mechanism that continuously calculates an "error value" as the difference between a measured variable, here a force, and a desired set point. The PID controller attempts to minimize the error over time by adjusting the power supplied to the motor to operate the motor and determine a new error value, which it is attempting to drive to zero. While a PID controller is utilized in one embodiment, alternate control algorithms such as a look up table, hysteresis control, fuzzy logic, etc. may be utilized to achieve the desired outcome. Once the control algorithm concludes its calculations, which occurs approximately every 100 milliseconds with a preferred processor, a signal, which is preferably a pulse width modulation signal, is sent from the motor controller to the motor to adjust the speed of the motor. Generally, the pulse width modulation signal will range from zero volts to twelve volts, corresponding to approximately zero miles per hour to approximately four miles per hour of wagon speed.

In one embodiment, the control algorithm is based on one or more of the following inputs: the value received from the input sensor (e.g., encoder, hall-effect sensor, or alternate sensor), the state of the micro switch, the state of the micro switch in the safety cut-off system, and the current state of the motor. Additional inputs may also be considered. In one example, the PID algorithm is as follows:

$$\text{Error}(t) = \text{Encoder Value}(t) - \text{Setpoint}$$

$$PWM\ \text{Value} = P*\text{Error}(t) + \int \text{Error}(t)*dt + D*(\text{Error}(t)/dt)$$

The setpoint, P, I and D are all constants that are determined by the overall system through testing. The setpoint is the encoder value that corresponds to a predetermined force. For example, if it is desired that the user pull the wagon with a maximum of 2 lbs. of force, the encoder value that corresponds to 2 lbs. of force is the setpoint. While an encoder is described in this section, any sensor data may be utilized. The goal of the PID algorithm and overall system is to speed up and slow down the motor and the wagon so that the user is always pulling no more than a certain pounds of force at any given speed, load or terrain.

In addition to a PID algorithm, the system may utilize a look up table and a different algorithm. For example, if the system is on and the handle angle is determined to be in the acceptable range, the motor output will initially be set to 0%. The micro switch in the handle grip will be analyzed to determine if it is open or closed. The encoder values will be obtained, an average will be calculated, the average will be compared against the look up table values, and the motor output rate change will be determined. Preferably, the motor output rate change will be added to prior output values, such as for example the prior fifteen values, with each subsequent iteration requiring the dropping of the oldest output value in an indexing manner. In this manner the output value will generally be smoothed over time. The lookup table is preferably utilized to determine a motor output rate change based on the average encoder value that is calculated after each iteration. If the calculated encoder value is around a desired set point the motor output will not be changed in an attempt to maintain a steady state cruising value. If the calculated encoder value is above the desired set point the motor output rate change will increase depending on how great the calculated encoder value is above the desired set point. And, if the calculated encoder value is below the desired set point, the motor output rate change will decrease as not as much assistance from the motor is needed. If the calculated encoder value is zero or if the micro switch is determined to be closed, the motor output change rate will decrease drastically as it is likely determined that the user has stopped.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosed embodiments may be embodied in other specific forms without departing from the spirit or central characteristics thereof. The present examples and embodiments, therefore, are to be considered in all respects as illustrative and not restrictive, and the disclosed embodiments are not to be limited to the details given herein. Accordingly, while the specific embodiments have been illustrated and described, numerous modifications come to mind without significantly departing from the spirit of the disclosure and the scope of protection is only limited by the scope of the accompanying Claims.

What is claimed is:

1. A power assist system for a wagon, comprising:
a wagon body, the wagon body having a plurality of wheels connected thereto, at least one of the plurality of wheels being a driven wheel;
a handle having a distal end and a proximal end, the proximal end of the handle being pivotally connected to the wagon body;
a handle grip adjacent a distal end of the handle;

a control system in one of the handle and the handle grip, the control system comprising a sensor to sense a load being applied to the handle grip that moves at least a portion of the handle grip axially with respect to the proximal end of the handle;

a drive system comprising a motor mechanically connected to the driven wheel; and, a microcontroller obtaining an input signal from the control system and providing an output signal to the drive system to selectively drive the driven wheel of the wagon.

2. The power assist system of claim 1, wherein the control system comprises a sensor to determine a load applied to the handle grip, wherein the load must be greater than a predetermined minimum threshold above zero pounds for the drive system to provide initial propulsion to the drive wheel.

3. The power assist system of claim 2, further comprising a micro switch as part of the control system, the micro switch being opened when a load greater than a predetermined minimum threshold above zero pounds is applied to the handle grip, the micro switch being closed when a load less than the predetermined minimum threshold is applied to the handle, the microcontroller obtaining a signal from the micro switch as to whether the micro switch is open or closed.

4. The power assist system of claim 2, further comprising a spring adjacent the distal end of the handle, wherein the spring provides a force that must be overcome for the handle grip to move axially with respect to the proximal end of the handle.

5. The power assist system of claim 1, further comprising a safety cut-off system connected to the handle, the safety cut-off system comprising a safety-control switch electrically connected to the microcontroller, the microcontroller adjusting the signal sent to the drive system based on a state of the safety-control switch.

6. The power assist system of claim 5, wherein the signal sent to the drive system is a zero volt signal when the safety-control switch is open.

7. The power assist system of claim 5, wherein the microcontroller turns off the drive system when the handle is below a preset angle and when the handle is above a preset angle.

8. The power assist system of claim 5, wherein the safety cut-off switch is adjacent the proximal end of the handle.

9. The power assist system of claim 1, further comprising a rechargeable battery connected to the wagon, the battery providing a source of power for the drive system.

10. The power assist system of claim 9, wherein the battery is removable from the wagon, and wherein the battery can be recharged on an auxiliary charger separate from the wagon.

11. The power assist system of claim 1, further comprising a remaining battery life indicator on the handle.

12. The power assist system of claim 1, wherein the drive system comprises a motor and a motor controller, and wherein the motor controller sends a signal to the motor to control output of the motor.

13. The power assist system of claim 12, further comprising an on/off switch, wherein the motor is electrically disconnected from the motor controller when the on/off switch is in the off state.

14. The power assist system of claim 1, wherein the signal from the motor controller ranges from approximately zero volts to approximately twelve volts.

15. A power assist system for a wagon, comprising:
a wagon body, the wagon body having a plurality of wheels connected thereto, at least one of the plurality of wheels being a driven wheel;
the driven wheel rotatingly connected to an axle;
a drive system comprising a motor mechanically connected to the driven wheel, the drive system further comprising a motor controller electrically connected to the motor;
a handle having a distal end and a proximal end, the proximal end of the handle being pivotally connected to the wagon body;
a handle grip adjacent a distal end of the handle, the handle grip having an internal sensor; and,
a microcontroller electrically connected to the sensor and the motor controller, the microcontroller obtaining a signal from the sensor, and based on the signal from the sensor the microcontroller sending a signal to the motor controller to speed up or slow down the motor.

16. The power assist system of claim 15, wherein the sensor within the handle senses an axial load being applied to the handle by a user.

17. The power assist system of claim 15, wherein to provide an initial signal to the motor to speed up the sensor must sense a load greater than a predetermined minimum threshold above zero pounds.

* * * * *